United States Patent
Yokoyama et al.

[11] Patent Number: 6,094,294
[45] Date of Patent: Jul. 25, 2000

[54] OPTICAL MODULATOR DEVICE, DISPLAY AND ELECTRONIC APPARATUS

[75] Inventors: Osamu Yokoyama; Tatsuya Shimoda; Satoru Miyashita; Yuji Fujimori; Mitsuro Atobe; Taku Aoyama; Tatsuaki Funamoto, all of Nagano-ken, Japan

[73] Assignee: Seiko Epson Corporation, Tokyo, Japan

[21] Appl. No.: 08/945,446

[22] PCT Filed: Feb. 13, 1997

[86] PCT No.: PCT/JP97/00394

§ 371 Date: Feb. 17, 1998

§ 102(e) Date: Feb. 17, 1998

[87] PCT Pub. No.: WO97/31283

PCT Pub. Date: Aug. 28, 1997

[30] Foreign Application Priority Data

| Feb. 26, 1996 | [JP] | Japan | 8-038456 |
| Mar. 18, 1996 | [JP] | Japan | 8-061502 |
| Oct. 15, 1996 | [JP] | Japan | 8-272738 |
| Nov. 25, 1996 | [JP] | Japan | 8-313827 |

[51] Int. Cl.$^7$ .......................... G02B 26/00; G02B 26/08; G03B 21/00; G03B 21/28

[52] U.S. Cl. .......................... 359/290; 359/291; 359/292; 359/295; 359/298; 353/30; 353/31; 353/97

[58] Field of Search .................. 359/223, 224, 359/290, 291, 292, 295, 298; 353/30, 31, 97, 98, 99

[56] References Cited

U.S. PATENT DOCUMENTS

| 4,074,253 | 2/1978 | Nadir | 359/291 |
| 4,441,791 | 4/1984 | Hornbeck | 359/295 |
| 4,571,603 | 2/1986 | Hornbeck et al. | 359/291 |
| 5,231,388 | 7/1993 | Stolz et al. | 340/783 |
| 5,481,396 | 1/1996 | Ji et al. | 359/224 |
| 5,504,629 | 4/1996 | Lim | 359/850 |
| 5,560,697 | 10/1996 | Lim et al. | 353/37 |
| 5,606,452 | 2/1997 | Min | 359/295 |
| 5,784,190 | 7/1998 | Worley | 359/291 |

FOREIGN PATENT DOCUMENTS

| 4-230723 | 8/1992 | Japan |
| 7-151984 | 6/1995 | Japan |
| 7-199094 | 8/1995 | Japan |
| 7-287176 | 10/1995 | Japan |

Primary Examiner—Margaret Burke
Attorney, Agent, or Firm—Oliff & Berridge, PLC

[57] ABSTRACT

An optical modulator device, a display unit and an electronic apparatus, each capable of presenting a high-contrast and bright image. An optical modulator device 101 includes a substrate and, on the substrate, an optical modulator structure in which a piezoelectric thin film layer 13 having piezoelectric property is interposed between thin film electrode layers 12, 14 having electrically conductive property with at least one of the thin film electrode layers 12, 14 having light reflective property, wherein the optical modulator structure is driven on a mirror element by mirror element basis, with one mirror element 15 being handled as a unit working independently to modulate a light ray.

49 Claims, 25 Drawing Sheets

104 : OPTICAL MODULATOR DEVICE

OPTICAL MODULATOR DEVICE, DISPLAY AND ELECTRONIC APPARATUS

BACKGROUND OF THE INVENTION

1. Field of the Invention

The present invention relates to an optical modulator device that modulates illuminating light rays to present an image by controlling mirror elements reflecting the illuminating light rays.

2. Description of Related Art

Optical modulator devices present an image by modulating an illuminating light ray with mirror elements. One of such optical modulator devices is disclosed in Japanese Unexamined Patent Publication 4-230723 and U.S. Pat. No. 5,231,388.

This optical modulator device tilts mirrors constructed of thin films corresponding to pixels by applying a voltage to their electrodes. Thus, the direction of reflection of the illuminating light ray reflected from the mirrors is controlled. When the mirror is tilted, the direction of reflection of the illuminating light ray changes, and the illuminating light ray is not reflected back in the same direction as its incident angle. When the mirror is not tilted, the illuminating light ray is reflected back in the same direction as its incident angle. By controlling the voltage applied to the mirror, the tilt of the mirror is controlled, and the lighting or non-lighting of the pixel is thus controlled.

In such a prior art optical modulator device, each mirror is separated from the structure that surrounds the mirror, and thus, there are many places such as end faces of the mirror from which light is scattered. For this reason, light is scattered even when the mirror remains inactive, and the contrast of an image displayed is degraded.

SUMMARY OF THE INVENTION

The present invention resolves the above problem, and it is an object of the present invention to provide an optical modulator device, a display unit and an Electronic apparatus, each capable of displaying a high-contrast and bright image.

The present invention in aspect 1 relates to an optical modulator device comprising a substrate and, on the substrate, an optical modulator structure in which a piezoelectric thin film layer having piezoelectric property is interposed between thin film electrode layers having electrically conductive property with at least one of the thin film electrode layers having light reflective property, wherein the optical modulator structure is driven on a mirror element by mirror element basis, with one mirror element being handled as a unit working independently to modulate a light ray.

The present invention in aspect 2 relates to an optical modulator device according to aspect 1, wherein the mirror elements are arranged in a matrix, including a one-dimensional array configuration, on the substrate.

The present invention in aspect 3 relates to an optical modulator device according to one of aspects 1 and 2, wherein a first thin film electrode layer of the thin film electrode layers constituting the optical modulator structure is electrically commonly connected to a plurality of mirror elements arranged in each of the columns constituting the matrix, on a column by column basis, and a second thin film electrode layer of the thin film electrode layers constituting the optical modulator structure is electrically commonly connected to a plurality mirror elements arranged in each of the rows constituting the matrix, on a row by row basis.

The present invention in aspect 4 relates to an optical modulator device according to one of aspects 1 and 2, wherein a first thin film electrode layer of the thin film electrode layers constituting the optical modulator structure is electrically commonly connected to all mirror elements and functions as a common electrode for all mirror elements, and a second thin film electrode layer of the thin film electrode layers constituting the optical modulator structure is arranged in an electrically isolated form for each of the mirror elements on a mirror element by mirror element basis.

The present invention in aspect 5 relates to an optical modulator device according to one of the aspects 3 and 4, wherein a substrate cutout area working as a optical path is formed in the substrate next to the first thin film electrode layer.

The present invention in aspect 6 relates to an optical modulator device according to aspect 5, wherein the substrate cutout areas are independently formed for the respective mirror elements on a one substrate cutout area per mirror element basis.

The present invention in aspect 7 relates to an optical modulator device according to aspect 6, wherein the shape of the opening of the substrate cutout area is formed of a curve.

The present invention in aspect 8 relates to an optical modulator device according to aspect 5, wherein the substrate cutout area is commonly shared by a plurality of mirror elements.

The present invention in aspect 9 relates to an optical modulator device according to aspect 8, wherein the substrate cutout area is commonly shared by the plurality of mirror elements arranged in a column.

The present invention in aspect 10 relates to an optical modulator device according to one of aspects 5 through 9, the second thin film electrode layer constituting the mirror elements is smaller in size than the opening of the substrate cutout area.

The present invention in aspect 11 relates to an optical modulator device according to one of aspects 1 through 10, wherein the mirror element is deformed in a convex projecting in the direction from which an incident light comes in.

The present invention in aspect 12 relates to an optical modulator device according to one of aspects 1 through 10, wherein the mirror element is deformed in a convex projecting in the direction opposite the direction from which an incident light ray comes in.

The present invention in aspect 13 relates to an optical modulator device according to one of aspects 1 through 12, wherein a member for shading a light ray is placed at the position where the light ray modulated by the mirror element is focused.

The present invention in aspect 14 relates to an optical modulator device according to aspect 13, wherein a transparent plate is arranged in parallel with the plane of the optical modulator structure.

The present invention in aspect 15 relates to an optical modulator device according to one of aspects 13 and 14, wherein the member for shading a light ray is a light shading member made of a material through which a light ray has difficulty being transmitted.

The present invention in aspect 16 relates to an optical modulator device according to aspect 15, wherein the light shading member is a metal plate of chromium or the like.

The present invention in aspect 17 relates to an optical modulator device according to aspect 15, wherein the light shading member is formed on the transparent plate.

The present invention in aspect 18 relates to an optical modulator device according to aspect 17, wherein the light shading member is an opaque material that is deposited or printed on the transparent plate.

The present invention in aspect 19 relates to an optical modulator device according to aspect 18, wherein the opaque material is chromium.

The present invention in aspect 20 relates to an optical modulator device according to aspect 18, wherein the opaque material is a pigmented ink.

The present invention in aspect 21 relates to an optical modulator device according to aspect 13, wherein the light shading member is of a rectangular shape in plane.

The present invention in aspect 22 relates to an optical modulator device according to aspect 13, wherein the light shading member is of a circular shape in plane.

The present invention in aspect 23 relates to an optical modulator device according to one of aspects 1 through 12 further comprising, to the side of the mirror elements on which an illuminating light ray is incident, a lens array which comprises lens elements corresponding to the respective mirror elements.

The present invention in aspect 24 relates to an optical modulator device according to aspect 23, wherein the conjugate point of the lens element to the mirror element side approximately agrees with the center of curvature of the mirror element.

The present invention in aspect 25 relates to an optical modulator device according to one of aspects 23 and 24 further comprising, between the optical modulator structure and the lens array, a light shading array comprising an array of light shading elements that are placed in the vicinities of the focal points of the respective lens elements.

The present invention in aspect 26 relates to an optical modulator device according to aspect 25, wherein the lens array and the light shading array are respectively mounted on the opposing sides of a transparent body.

The present invention in aspect 27 relates to an optical modulator device according to one of aspects 23 and 24, wherein the lens array comprises a first lens array facing an incident illuminating light ray and a second lens array facing the optical modulator structure, and the optical modulator device comprises a pinhole array, between the first lens array and the second lens array, having an array of pinholes which are arranged in the vicinities of the focal points of the respective lens elements constituting the first lens array and also in the vicinities of the conjugate points of the respective lens elements constituting the second lens array, and wherein the optical axis of each of respective the mirror elements, the optical axis of each of the respective lens elements in the first lens array, the optical axis of each of the respective pinholes, and the optical axis of each of the respective lens elements in the second lens array are mutually collinear.

The present invention in aspect 28 relates to an optical modulator device according to aspect 27, wherein the first lens array and the pinhole array are respectively mounted on the opposing sides of a transparent body.

The present invention in aspect 29 relates to an optical modulator device according to one of aspects 23 and 24 further comprising, between the optical modulator structure and the lens array, a pinhole array comprising an array of pinholes that are placed in the vicinities of the focal points of the respective lens elements.

The present invention in aspect 30 relates to an optical modulator device according to aspect 29, wherein the lens array and the pinhole array are respectively mounted on the opposing sides of a transparent body.

The present invention in aspect 31 relates to an optical modulator device according to one of aspects of 23 through 30, wherein each of the lens elements constituting the lens array is constructed of a Fresnel lens structure.

The present invention in aspect 32 relates to an optical modulator device according to one of aspects 1, 2 and 4 through 31, wherein transistor structures for electrically driving the mirror elements are correspondingly arranged on a one transistor structure per one mirror element basis.

The present invention in aspect 33 relates to an optical modulator device according to aspect 32, wherein the transistor structure is of a thin film transistor that comprises a thin film electrode layer and an insulating layer.

The present invention in aspect 34 relates to an optical modulator device according to one of aspects 32 and 33, wherein the transistor structure is formed on a second substrate that is different from the substrate that bears the mirror elements, and the substrate that bears the mirror elements is bonded to the second substrate in such a manner that a drain electrode of the transistor structure is electrically connected to a second thin electrode layer constituting the mirror element to be driven by the transistor structure.

The present invention in aspect 35 relates to an optical modulator device according to aspect 34, wherein the second substrate is a glass substrate.

The present invention in aspect 36 relates to an optical modulator device according to aspect 34, wherein the second substrate is a silicon substrate.

The present invention in aspect 37 relates to an optical modulator device according to one of aspects 34 through 36, wherein a space is provided to allow the mirror element to be deformed.

The present invention in aspect 38 relates to an optical modulator device according to one of aspects 34 through 37, wherein a driver circuit for driving the transistor structure is monolithically formed on the substrate that bears the transistor structure.

The present invention in aspect 39 relates to a display unit having the optical modulator device according to one of aspects 1 through 38 comprising:

an illuminating optical system directing substantially parallel illuminating light rays to the optical modular device at right angles thereto, a light shading optical system for shading light rays reflected from undeformed mirror elements in the optical modulator device and passing therethrough light rays reflected from deformed mirror elements in the optical modulator device, and a display optical system for focusing the light rays that pass through the light shading optical system, to form an image.

The present invention in aspect 40 relates to a display unit according to aspect 39, wherein the illuminating optical system comprises a light source, an optical system for converting radiated light rays from the light source into substantially parallel light rays, and a half-mirror for deflecting the substantially parallel light rays by an approximately right angle to illuminate the optical modulator device, and wherein light rays reflected from the optical modulator device are transmitted through the half-mirror and the light shading optical system, and are then displayed as an image by the display optical system.

The present invention in aspect 41 relates to a display unit according to aspect 39, wherein the illuminating optical system comprises a polarizing conversion optical system for aligning the directions of oscillation of light rays radiated from the light source, a polarizing beam splitter arranged between the polarizing conversion optical system and the optical modulator device, and a ¼-wave plate arranged between the polarizing beam splitter and the optical modulator device.

The present invention in aspect 42 relates to a display unit according to one of aspects 39 through 41, wherein the illuminating light rays are directed to the mirror elements constituting the optical modulator device from the side of the substrate that bears the mirror elements.

The present invention in aspect 43 relates to a display unit according to one of aspects 39 through 42, wherein the amount of deformation of the mirror element is continuously controlled by varying continuously a voltage applied to the mirror element, and the gradation of the displayed image is continuously controlled by varying the quantity of light that passes through the light shading optical system.

The present invention in aspect 44 relates to a display unit having the optical modulator device according to one of aspects 1 through 38 comprising:

a color separation optical system for separating the illuminating light rays into a plurality of primary color light rays, the optical modulator devices for receiving and reflecting respectively the primary color light rays separated by the color separation optical system, a color synthesizing optical system for synthesizing the light rays from the optical modulator devices, and a projection lens for forming on an image plane an image synthesized by the color synthesizing optical system.

The present invention in aspect 45 relates to a display unit according to aspect 44 comprising:

a polarizing conversion optical system arranged between the light source and the color separation optical system, for aligning the directions of oscillation of light rays radiated from the light source, a polarizing beam splitter arranged between the polarizing conversion optical system and the color separation optical system for reflecting the light rays transmitted through the polarizing conversion optical system to direct the light rays to the color separation optical system, and ¼-wave plates, each arranged between each of the optical modulator devices for the respective primary colors and the color separation optical system, wherein light rays, reflected from the respective optical modulator devices and synthesized through the color synthesizing optical system, are transmitted through the polarizing beam splitter and projected on the image plane through the projection lens.

The present invention in aspect 46 relates to a display unit according to aspect 44 comprising:

a polarizing conversion optical system arranged between the light source and the color separation optical system, for aligning the directions of oscillation of light rays radiated from the light source, a polarizing beam splitter arranged between the polarizing conversion optical system and the color separation optical system for transmitting the light rays transmitted through the polarizing conversion optical system to direct the light rays to the color separation optical system, and ¼-wave plates, each arranged between each of the optical modulator devices for the respective primary colors and the color separation optical system, wherein light rays, reflected from the respective optical modulator devices and synthesized through the color synthesizing optical system, are reflected back from the polarizing beam splitter and then projected on the image plane through the projection lens.

The present invention in aspect 47 relates to a display unit according to one of aspects 44 through 46, wherein a dichroic prism as a single optical component works as the color separation optical system and the color synthesizing optical system as well.

The present invention in aspect 48 relates to a display unit according to one of aspects 44 through 47, wherein the optical modulator devices for the primary colors are different from device to device depending on primary color in terms of shapes and optical characteristics of the lens elements constituting the lens array of the optical modulator device, and the lens elements of the lens array in the optical modulator device for one primary color are designed in consideration of the range of wavelengths of the one primary color.

The present invention in aspect 49 relates to a display unit according to one of aspects 44 through 48, wherein the primary colors are red, green and blue.

The present invention in aspect 50 relates to an electronic apparatus, such as a computer, a television set, a watch, an electronic pocket notebook, and an electronic telephone, which incorporates the display unit according to one of aspects 44 through 49.

DETAILED DESCRIPTION OF PREFERRED EMBODIMENTS

First Embodiment

Figure 1:
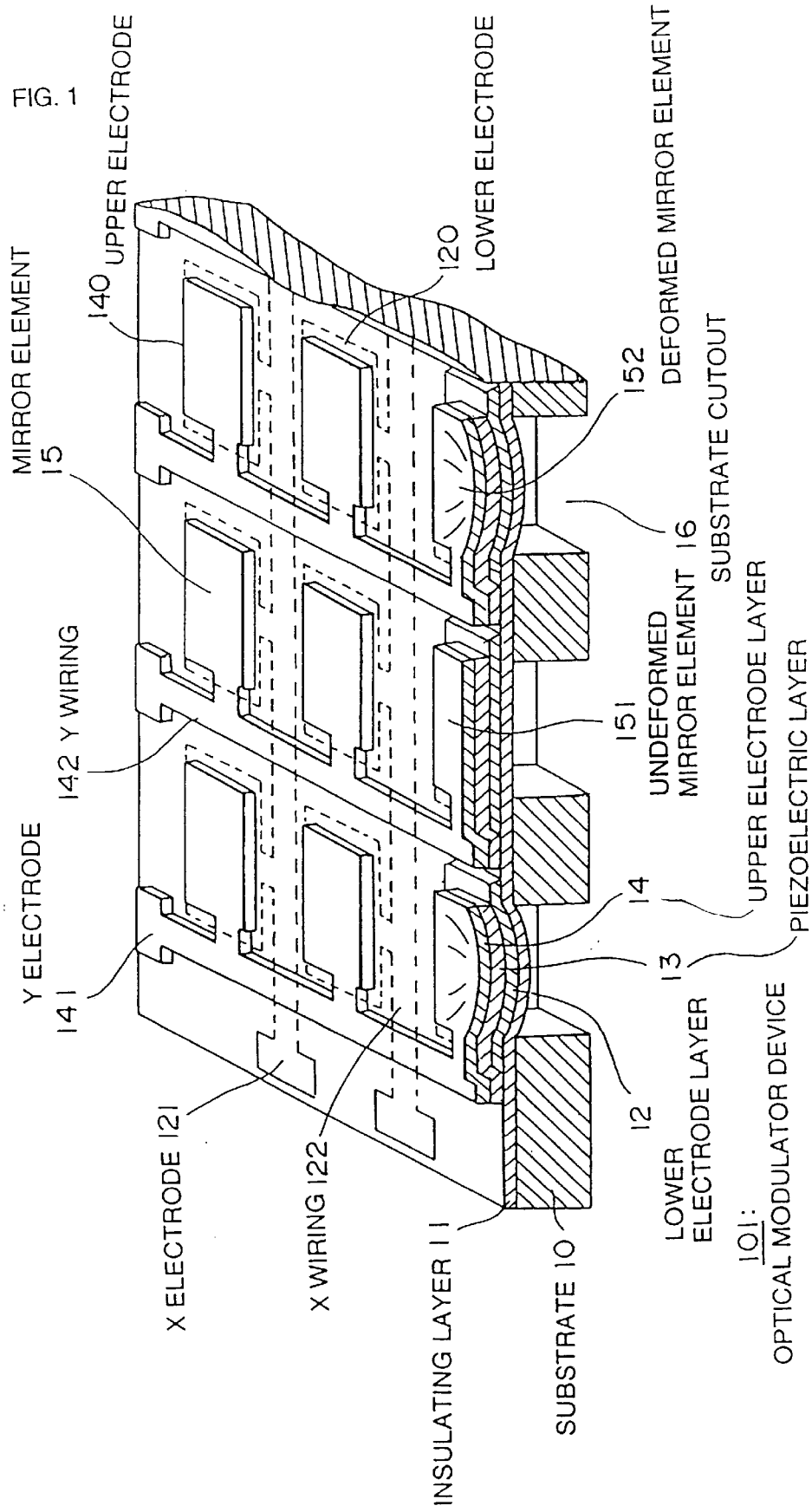
FIG. 1; Perspective view with its portions in cross section showing an optical modulator device according to a first embodiment of the present invention.

FIG. 1 is a perspective view with its portions in cross section showing the structure of an optical modulator device according to a first embodiment of the present invention. For ease of visualization, mirror elements 15 are shown in cross section so as to present its layered structure of each layer, but the other mirror elements are shown with their layered structures depicted roughly.

As shown, an optical modulator device 101 of the present invention is formed by laminating uniformly an insulating layer 11 on a substrate 10, and further successively laminating a lower electrode layer 12, a piezoelectric layer 13, and an upper electrode layer 14 on the insulating layer 11.

The optical modulator device 101 is constructed by arranging the mirror elements 15, each being one reflective element corresponding to each pixel, in an X direction (in a row) and in a Y direction (in a column) in a matrix formation. The substrate 10 is made of silicon (Si) or the like. The substrate 10 is etched on a per mirror element 15 basis to form a substrate cutout area 16. An illuminating light ray is directed to the mirror element 15 through the substrate cutout area 16, is reflected by the mirror element 15, and is then projected out passing again through the substrate cutout area 16. The insulating layer 11 is a thermal oxidation film such as $SiO_2$ or the like. The lower electrode layer 12 is a metal film of Pt or the like. The lower electrode layer 12 is patterned. Arranged as a result are a lower electrode 120 on a per mirror element 15 basis, an X wiring 122 for electrically connecting the lower electrode 120 of each mirror element 15 in the X direction, and an X electrode 121 that is a voltage terminal. The piezoelectric layer 13 is deformed when a voltage is applied between the lower electrode layer 120 and an upper electrode 140. The upper electrode layer 14 is made of the same material as the lower electrode layer 12. The upper electrode layer 14 and the piezoelectric layer 13 are also patterned. Arranged as a result are the upper electrode 140 on a per mirror element 15 basis, a Y wiring 142 for electrically connecting the upper electrode 140 of each mirror element 15 in the Y direction, and a Y electrode 141 that is a voltage terminal.

As described above, each mirror element 15 has a structure in which the piezoelectric layer 13 is sandwiched between the lower electrode 120 and the upper electrode 140. In such a structure, voltages corresponding to pixels modulated and other pixels unmodulated are applied between the X electrode 121 and the Y electrode 141, with respect to each X wiring 122, and thus only a singles mirror element 15 determined by the X electrode and the Y electrode is fed with a voltage. In mirror elements 151 with electrodes between which no predetermined voltage is fed, the piezoelectric layer 13 is not deformed and thus the mirror element is not deformed. On the other hand, in mirror elements 152 with electrodes between which a predetermined voltage is fed, the piezoelectric layer 13 is deformed and the mirror element is deformed.

In the optical modulator device 101, the illuminating light rays may be introduced from above in FIG. 1 or may be introduced from below through the substrate cutout area 16. When the illuminating light rays are introduced through the substrate cutout area 16, an undeformed mirror element 151 reflects light rays in parallel if the incident light rays are parallel light rays. In a deformed mirror element 152, the mirror element is deformed in a convex projecting toward the substrate cutout side, and the illuminating light ray is diverged. By applying sequentially the voltage to each X electrode 121, optical modulation is performed in connection with all mirror elements arranged in a matrix.

The amount of deformation of the mirror element 15 depends on the voltage applied to the piezoelectric layer 13. With the size of the upper electrode 140 being 50 $\mu$m×50 $\mu$m and the opening size of the substrate cutout area 16 being 60 $\mu$m×60 $\mu$m, the displacement of the piezoelectric layer in the center of the opening is maximized with a voltage of 20 volts applied to the piezoelectric layer 13. The displacement is approximately 0.2 $\mu$m.

The area of the upper electrode 140 is set slightly smaller than the opening of the substrate cutout area 16. For example, when the opening of the substrate cutout area 16 is 60 $\mu$m×60 $\mu$m as described above, the upper electrode 140 is as large as 50 $\mu$m×50 $\mu$m. By setting the upper electrode 140 to be smaller than the opening of the substrate cutout area 16, the periphery of the upper electrode 140 is not supported during deformation action of the mirror element 15, and thus the mirror element 15 is easily deformed in a convex projecting to the side of the substrate cutout area 16. However, if the mirror element 15 is deformed at any rate, the size of the upper electrode 140 may be larger than the opening of the substrate cutout area 16.

By inverting the polarity of the voltage applied to the piezoelectric layer but within the voltage range where the polarization direction of the piezoelectric layer 13 remains noninverted, the mirror element 15 can be deformed in a convex projecting in the direction opposite to the side of the substrate cutout area 16.

Although as shown in FIG. 1, the planar shape of the mirror element 15 is rectangular, a diversity of shapes including a circle, an ellipse, a polygon such as a hexagon may be contemplated.

Although the mirror elements 15 are arrayed in a two-dimensional matrix as shown in FIG. 1, a variety of other arrangements including a one-dimensional array, where mirror elements are one-dimensionally arrayed, ray be contemplated.

As means for selecting a mirror to be deformed, other than the arrangement where the above-described X wirings and Y wirings are sequentially fed with voltage, one arrangement is contemplated where each mirror element is driven by a transistor structure mounted to each mirror element, as will be described in connection with an embodiment.

Manufacturing Process of the Optical Modulator Device

Figure 2:
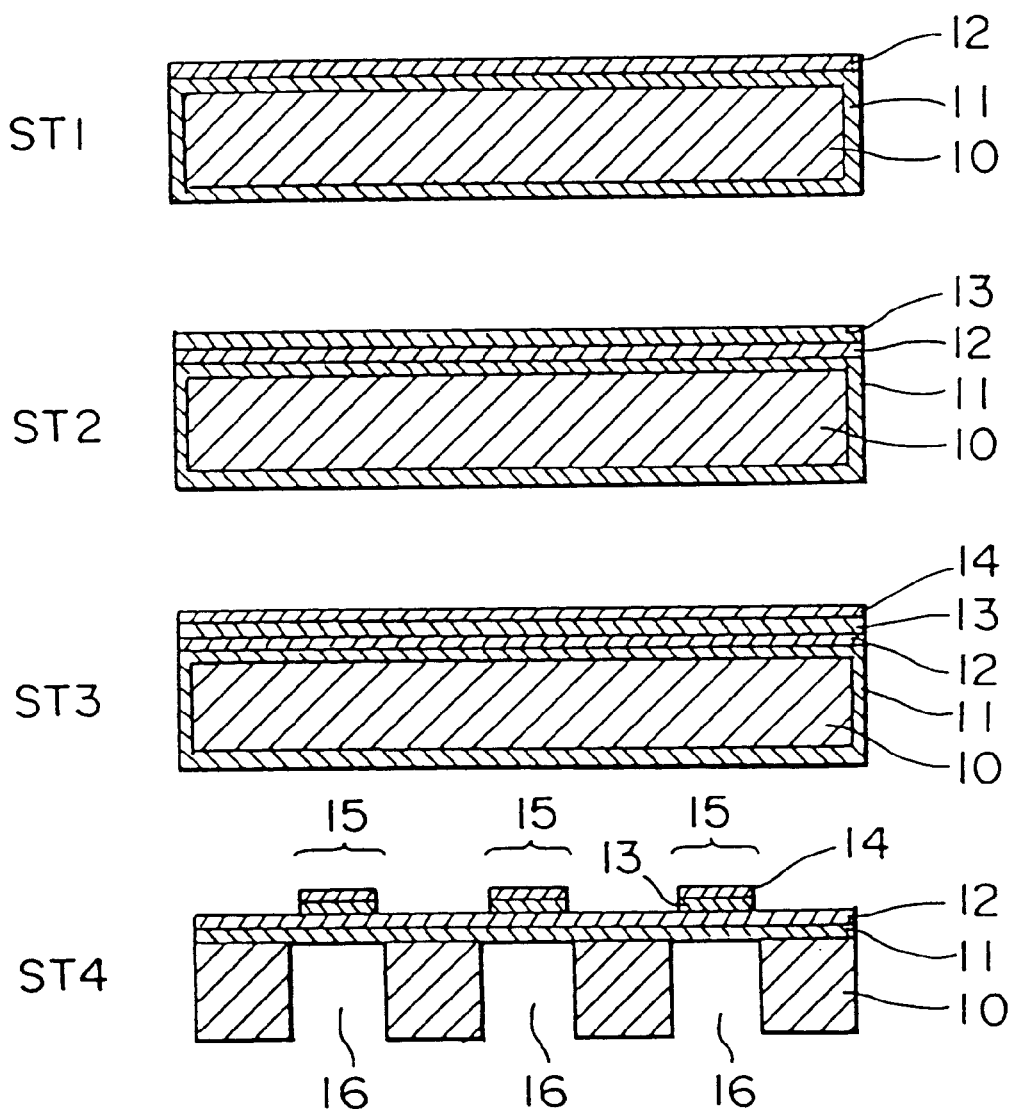
FIG. 2; Process drawing of the optical modulator device of the first embodiment.

FIG. 2 is a cross-sectional view illustrating the manufacturing process of the optical modulator device 101 of the first embodiment.

Step ST1: The insulating layer 11 of $SiO_2$ is uniformly formed on the substrate 10 of silicon or the like by thermally oxidizing the surface of Si. The lower electrode layer 12 is further formed on top of the insulating layer 11. After the formation of the lower electrode layer 12, etching is performed to pattern the lower electrode layer. The lower electrode layer 12 is made of a material having electrically conductive property and light reflective property. The lower electrode layer 12 is a metal thin film of Pt or Ti, for example.

As the substrate 10, glass, ceramic or the like may be used besides silicon. If the substrate 10 is of an insulating material, the insulating layer 11 is dispensed with. If the upper electrode layer 14 has light reflective property, no light reflective property is required of the lower electrode layer 12. Each of the lower electrode 120 and the upper electrode layer 14 may be a composite layered structure of a Pt film and other film to increase bond with other layers.

Step ST2: In succession, a lead zirconate titanate layer (hereinafter referred to as PZT layer) as the piezoelectric layer 13 is formed. The PZT layer is formed to be 0.8 $\mu$m thick, using sol-gel process or sputtering process. The piezoelectric layer 13, after film formation, is thermally annealed.

Step ST3: The upper electrode layer 14 is formed on top of the piezoelectric layer 13. The composition consideration for the lower electrode layer 12 is also applicable to the composition of the upper electrode layer 14. If the lower electrode layer 12 has light reflective property, no light reflective property is required of the upper electrode layer 14. After the film formation of the upper electrode layer 14, the upper electrode layer 14 and the piezoelectric layer 13 are subjected to an etching process to be formed in their required patterns.

Step ST4: The above process creates mirror elements 15 in a matrix (two-dimensional array) on the substrate 10 as thick as about 200 $\mu$m. To allow a passage for the illuminating light ray, the substrate cutout areas 16 respectively corresponding to the mirror elements 15 are produced through the etching process, and thus the mirror elements 15 are layer-structured to allow themselves to vibrate.

Instead of the above arrangement in which the substrate 10 is etched from below to allow the mirror elements to vibrate from the substrate, a dummy layer as large as the mirror elements 15 may be formed, then the mirror structure may be produced, and then the dummy layer may be removed to allow the mirror structure to vibrate.

In the first embodiment of the optical modulator device, the piezoelectric layer is sandwiched between the electrode layers, and the voltage applied between the electrode layers causes the mirror elements to deform in a curvature. In this arrangement, there are few discontinuous sections in the reflective layer, and thus the light ray reflected in a scattering fashion, namely noise against the modulated light ray, is controlled.

Since the amount of deformation in the mirror elements depends on the voltage applied to the piezoelectric layer, the applied voltage is used to control the curvature of radius of the curved surface of the mirror elements, and light ray is thus continuously modulated.

Unlike the prior art optical modulator device, this embodiment of the present invention does not need to construct a hollow three-dimensional structure of a thin film, and is thus easy to manufacture.

By adjusting the compositions of the electrode layers and piezoelectric layer to provide light transmissivity, these layers may be used not only as a reflective-type optical modulator device but as a light transmissive-type optical modulator device where an illuminating light ray projected from below is modulated and then transmitted therethrough for presentation.

Second Embodiment

A second embodiment of the present invention relates to an optical modulator device in which a mirror block constructed of mirror elements and a TFT block constructed of a thin film transistor are bonded.

Figure 3:
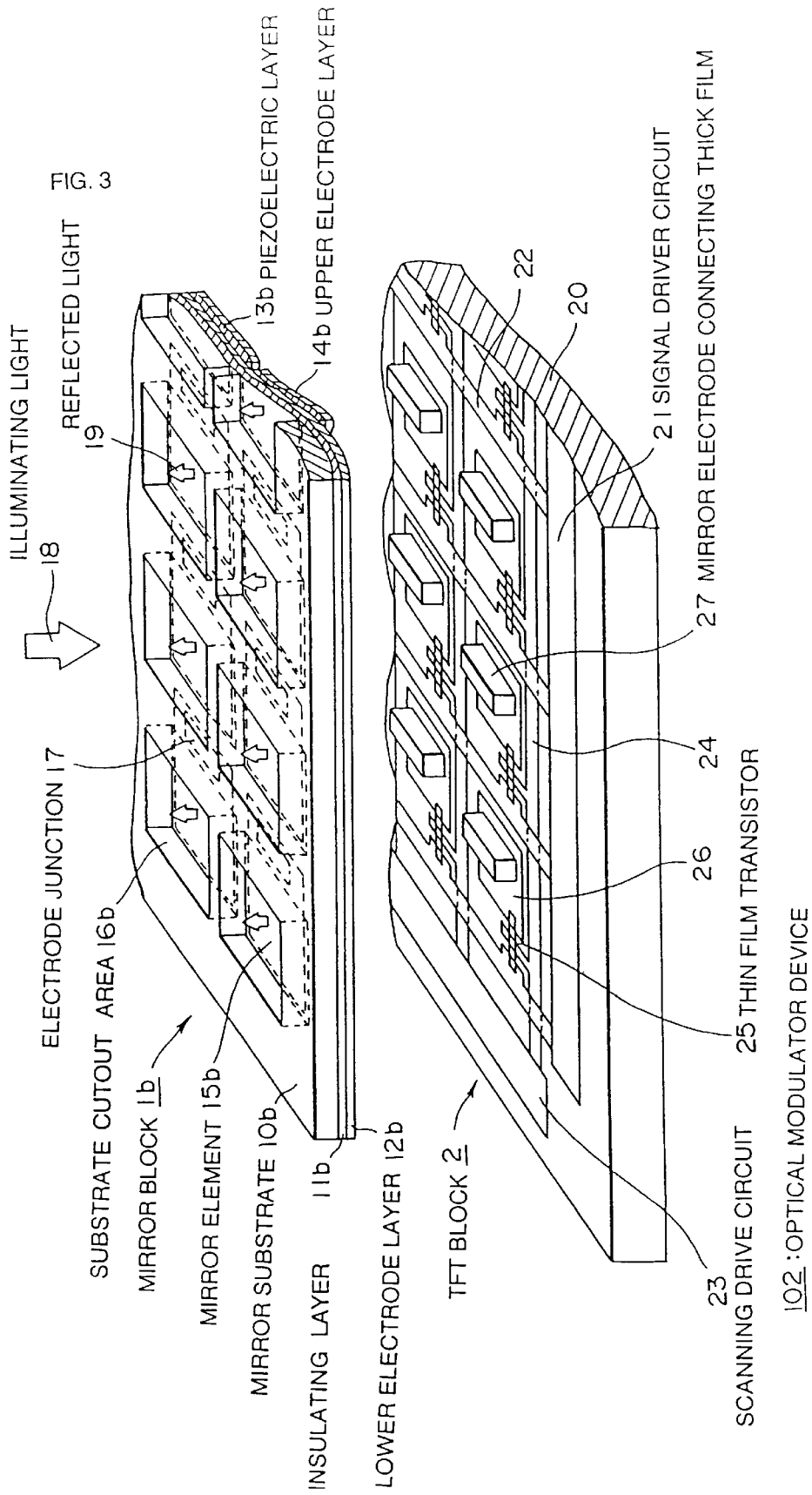
FIG. 3; Perspective view with its portions in cross section showing an optical modulator device according to a second embodiment of the present invention.
Figure 4:
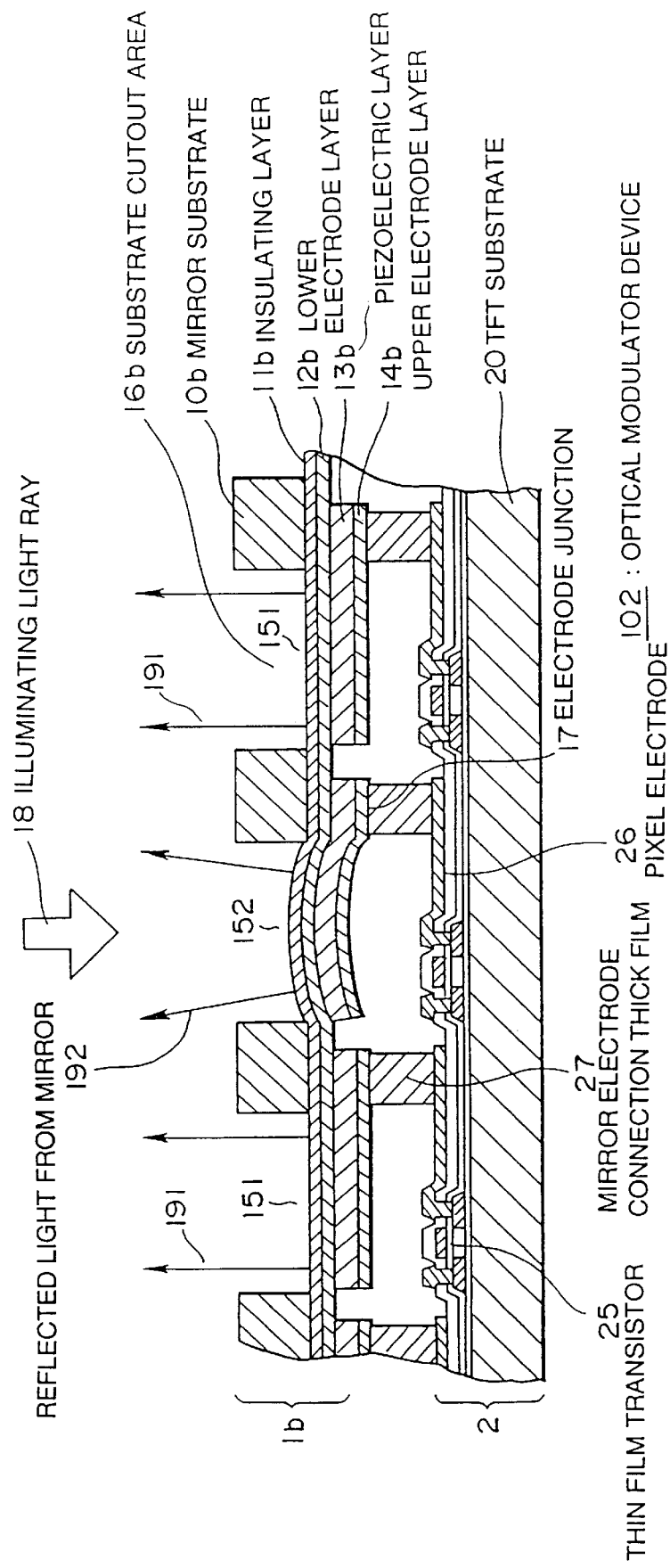
FIG. 4; Cross-sectional view showing the operation of the optical modulator device of the second embodiment.

Referring to FIG. 3 and FIG. 4, this embodiment of the optical modulator device is now discussed. FIG. 3 is a perspective view with its portions in cross section showing the optical modulator device of this embodiment, and FIG. 4 is a cross-sectional view showing part of the optical modulator device including mirror elements.

The optical modulator device 102 of this embodiment has a structure in which a mirror block 1b of an array of mirror elements is bonded to a TFT (for Thin Film Transistor) block 2 of an array of thin films transistors for driving the mirror elements. One thin film transistor 25 is electrically connected to its respective mirror element 15b to drive it. As shown in FIG. 3, for ease of visualization, the mirror block 1b of an array of mirror elements 15b is separately shown from the TFT block 2 of an array of thin film transistors 25.

The structure of the mirror block 1b is first discussed. In the mirror block 1b, an insulating layer 11b of a thermal oxidation film $SiO_2$ is formed on the surface of the substrate 10b of silicon. A lower electrode layer 12b of Pt is laminated on top of the insulating layer 11b. The lower electrode layer 12b is a common electrode to which all mirror elements are electrically connected. Laminated successively on top of the lower electrode layer 12b are a piezoelectric layer 13b of a PZT film and then an upper electrode layer 14b of Pt.

The lower electrode layer 12b extends coextensively with the entire area of the substrate 10b. The optical modulator device of this embodiment differs from the optical modulator device of the first embodiment in that this embodiment has the upper electrode layer 14b on one mirror element 15b is isolated from that of another mirror element 15b. The composition of each layer and the shape of the mirror elements remain the same as in the first embodiment.

The structure of the TFT block 2 is basically identical to the array of thin film transistors typically employed in liquid crystal displays. A thin film transistor 25 is formed on a TFT substrate 20 constructed of glass, quartz or silicon. The thin film transistor 25 is driven by a scanning driver circuit 23 and a signal driver circuit 21 formed on the TFT substrate and a scanning drive line 24 and a signal drive line 22 connected respectively thereto. This driving modulates the voltage at a pixel electrode 26 connected to a drain of the thin film transistor 25.

A mirror electrode connecting thick film 27 as thick as 20 μm is formed on the pixel electrode 26 using a plating technique to assure electrical conduction between the pixel electrode 26 and an electrode junction 17 of the upper electrode layer 14b in the mirror block 1b.

As shown in FIG. 4, the mirror block 1b and the TFT block 2 are thermocompression bonded together, with the electrode junctions 17 of the mirror block 1b aligned with the mirror electrode connecting thick films 27 of the TFT block.

The optical modulation operation of the optical modulator device 102 of this embodiment is now discussed. The mirror element 152 driven by the thin film transistor 25 is deformed in a convex projecting toward the substrate cutout area 16b as shown in the same figure. Reflected light ray 192 are divergent light rays. When parallel illuminating light rays 18 are directed to the optical modulator device 102 from the side of the substrate cutout area 16b, the lower electrode layer 12b works as a reflecting mirror. In an undeformed mirror 151, reflected light rays 191 are projected out as parallel light rays.

According to the characteristics and structure of the piezoelectric layer 13 in this embodiment, the mirror element 15b is deformed in a convex projecting to the side of the substrate cutout area 16b. By inverting the polarity of the voltage applied to the piezoelectric layer but within the voltage range where the polarization direction of the piezoelectric layer remains noninverted, the mirror element 15b may be deformed in a convex projecting to the side of the thin film transistor 25.

Third Embodiment

A third embodiment of the present invention relates to a modification of the second embodiment, where the planar shape of the mirror element is modified.

Figure 5:
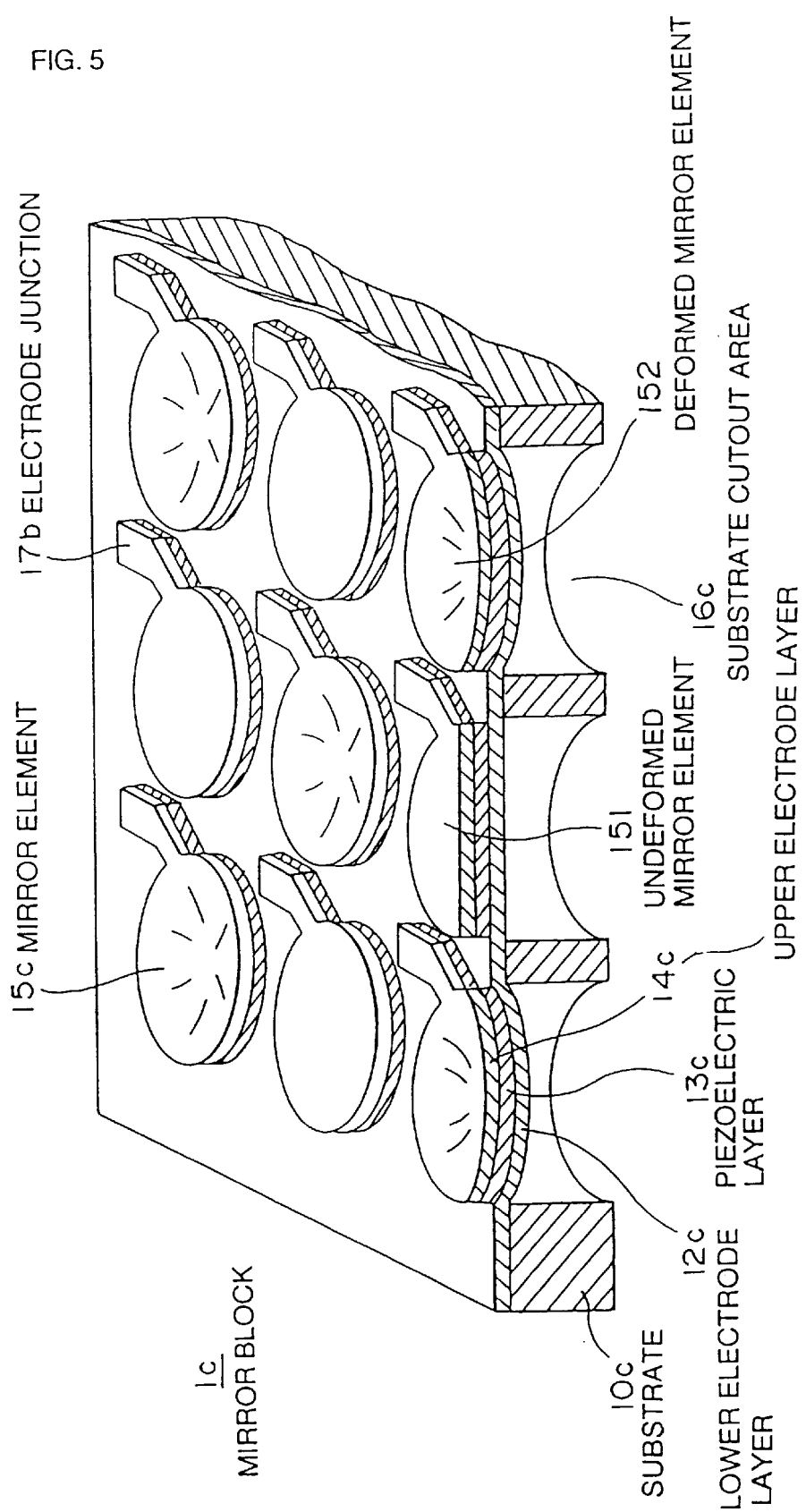
FIG. 5; Perspective view with its portions in cross section showing an optical modulator devise according to a third embodiment of the present invention, as a modification.

FIG. 5 is a perspective view with its portions in cross section showing a mirror block that constitutes an optical modulator device according to the third embodiment. The mirror block 1c of the third embodiment is bonded to the TFT block 2 described in connection with the above embodiment, both constituting the optical modulator device. This embodiment remains identical to the preceding embodiments in that a lower electrode layer 12c, a piezoelectric layer 13c and an upper electrode layer 14c are successively laminated on a substrate 10c. The compositions and deformation of the lower electrode layer 12c, piezoelectric layer 13c and upper electrode layer 14c remain unchanged from those in the preceding embodiments.

Although the planar shape of the mirror element in the second embodiment is rectangular as shown, the planar shape of the mirror element in this embodiment is circular. Namely, the planar shape of the upper electrode layer 14c and the opening of the substrate cutout area 16c are circular. An electrode junction 17c is formed on an upper electrode layer 14c in each mirror element 15c. The substrate 10c is made of glass. Since the glass is a insulating material, the insulating layer 11 in the second embodiment is dispensed with. Alternatively, the substrate 10c may be made of a ceramic.

The mirror block 1c of this embodiment is bonded to the TFT block 2 identical to the one in the second embodiment. The electrode junctions 17b of the mirror block 1c are aligned with and then thermocompression bonded to the mirror electrode connecting thick films 27 of the TFT block for electrical connection.

In such an arrangement, the mirror element (152) is deformed with a voltage applied to the piezoelectric layer 13c. Since the mirror element 15c is displaced to a maximum at its center, the planar shape of the upper electrode layer 14c is preferably symmetrical with respect to its center.

Although in the third embodiment, the thin film transistor (TFT block) is used to drive the mirror element, the mirror block only can constitute an optical modulator device as in the first embodiment if an X wiring and Y wiring are arranged on the lower electrode layer and the upper electrode layer, respectively.

According to the third embodiment, as described above, the planar shape of the mirror element is circular, disturbances in displacement of the reflective surface and stress concentration of the reflective surface are reduced, and noisy light ray is accordingly reduced. Since the peeling of the layers is prevented, a highly reliable optical modulator device is provided.

Fourth Embodiment

Although in the preceding embodiment, the substrate cutout area is provided on a per mirror element basis, a plurality of mirror elements share a common substrate cutout area in a fourth embodiment.

Figure 6:
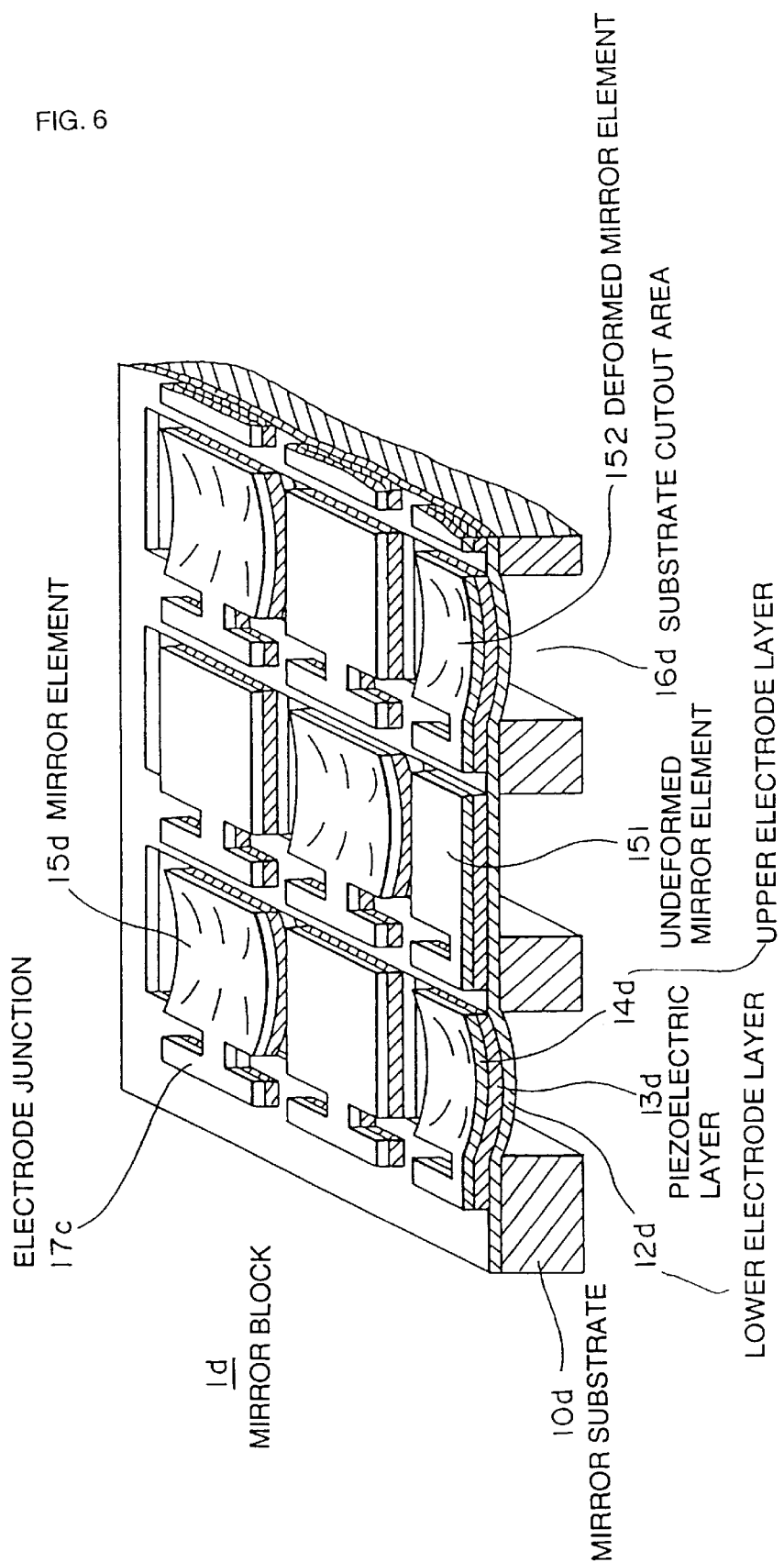
FIG. 6; Perspective view with its portions in cross section showing an optical modulator device according to a fourth embodiment of the present invention.

FIG. 6 is a perspective view with its portions in cross section showing a mirror block constituting an optical modulator device according to the fourth embodiment. The mirror block 1d in the fourth embodiment is bonded to the TFT2 block 2 described in connection with the preceding embodiments, both constituting the optical modulator device 103 (refer to FIG. 7). This embodiment remains identical to the preceding embodiments in that a lower electrode layer 12d, a piezoelectric layer 13d and an upper electrode layer 14d are successively laminated on a substrate 10d. The compositions of the substrate 10, lower electrode layer 12d, piezoelectric layer 13d and upper electrode layer 14d remain unchanged from those in the preceding embodiments.

As shown, in this embodiment, one substrate cutout area is commonly shared by a plurality of mirror elements. As shown, for example, for an array of mirror elements 15d in the direction of column along the same Y coordinate, a substrate cutout area 16d is provided with its direction of length aligned with the direction of column of the mirror elements. Specifically, one substrate cutout area 16d extends over one column of mirror elements 15d. Each mirror element 15d is restrained at its two opposite sides only by the substrate 10.

Figure 7:
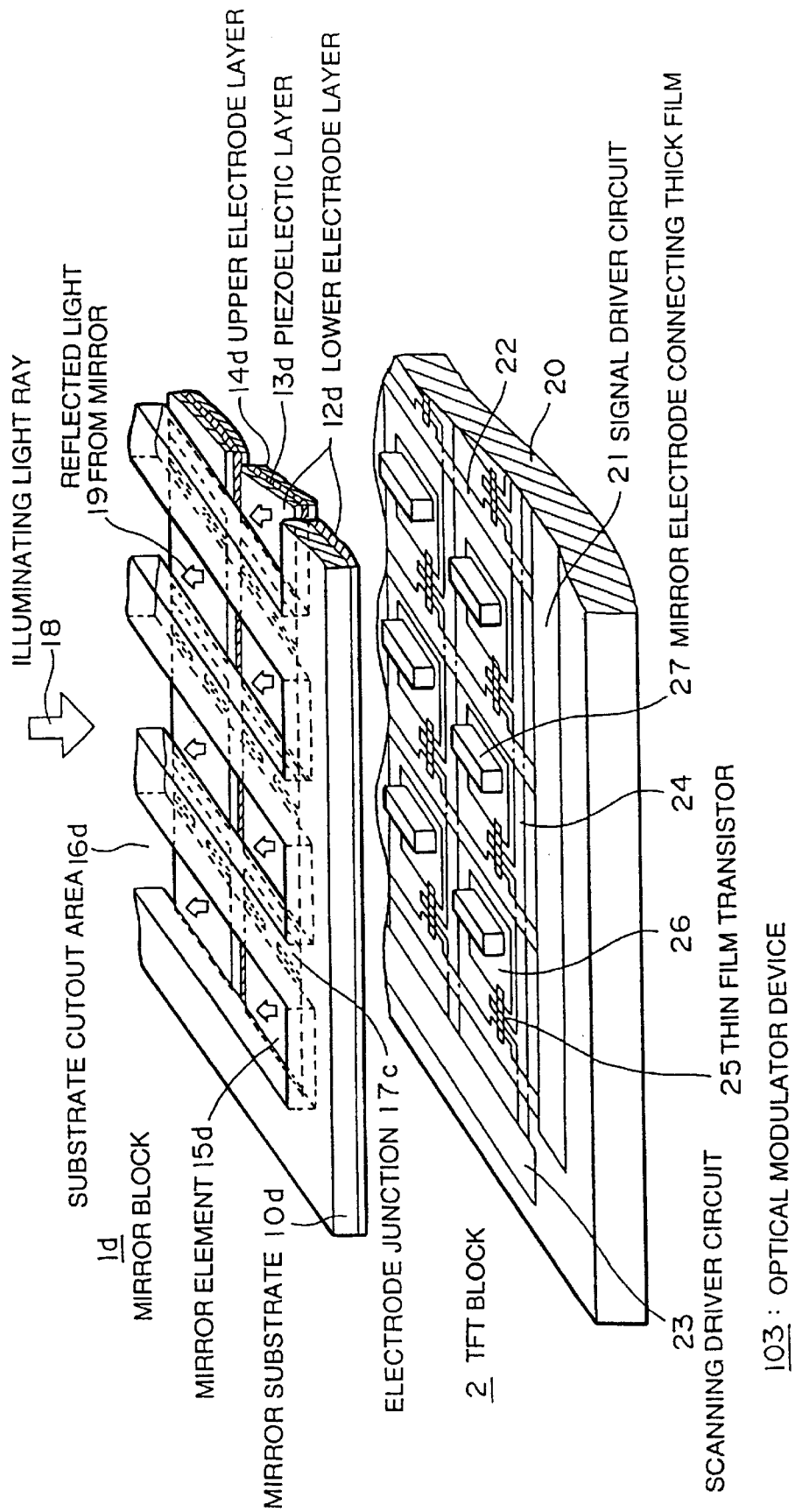
FIG. 7; Explanatory view showing the shape of a cutout area of the optical modulator device of the fourth embodiment.

FIG. 7 is a perspective view with its portions in cross section showing the optical modulator device 103 of the fourth embodiment. In the fourth embodiment, the mirror block 1d is bonded to the TFT block 2 identical to the one in the second embodiment. The electrode junctions 17c of the mirror block 1d are aligned with and then thermocompression bonded to the mirror electrode connecting thick films 27 of the TFT block for electrical connection. One mirror element 15d is electrically connected to its respective thin film transistor 25. As shown in FIG. 7, for ease of visualization, the mirror block id of an array of mirror elements 15d is separately shown from the TFT block 2 of an array of thin film transistors 25. The structure and connection of the TFT block 2 remain unchanged from those in the second embodiment, and are not discussed here again.

The optical modulation operation of the optical modulator device 103 of this embodiment is now discussed. In the arrangement described above, when a voltage is applied between the lower electrode layer 12d and the upper electrode layer 14d in a mirror element 15d selected to be deformed, the piezoelectric layer 13d contracts inwardly deforming the mirror element 15d in a convex projecting toward the substrate cutout area 16d below it as shown by 152 in FIG. 6. Since the opposite two sides of each mirror element 15d are restrained with the two other sides left free in this case, each mirror element 15d is deformed in a generally cylindrical or generally toroidal configuration. A mirror element 15d, with no voltage applied between the lower electrode layer 12d and the upper electrode layer 14d, does not deform and keeps its planar film configuration (151 in FIG. 6).

When this optical modulator device 103 is subjected to parallel light rays coming in at right angles to the substrate 10, an undeformed mirror 151 works as a plane mirror, making the reflected light rays remain parallel. On the other hand, a deformed mirror 152 works as a convex mirror, making the reflected light rays diverge, and thereby functioning as a device modulating light (refer to FIG. 4 and its corresponding description already given).

Although in the fourth embodiment, the thin film transistor (TFT block) is used to drive the mirror element, the mirror block only can constitute an optical modulator device as in the first embodiment if an X wiring and Y wiring are arranged on the lower electrode layer and the upper electrode layer, respectively.

Figure 8A:
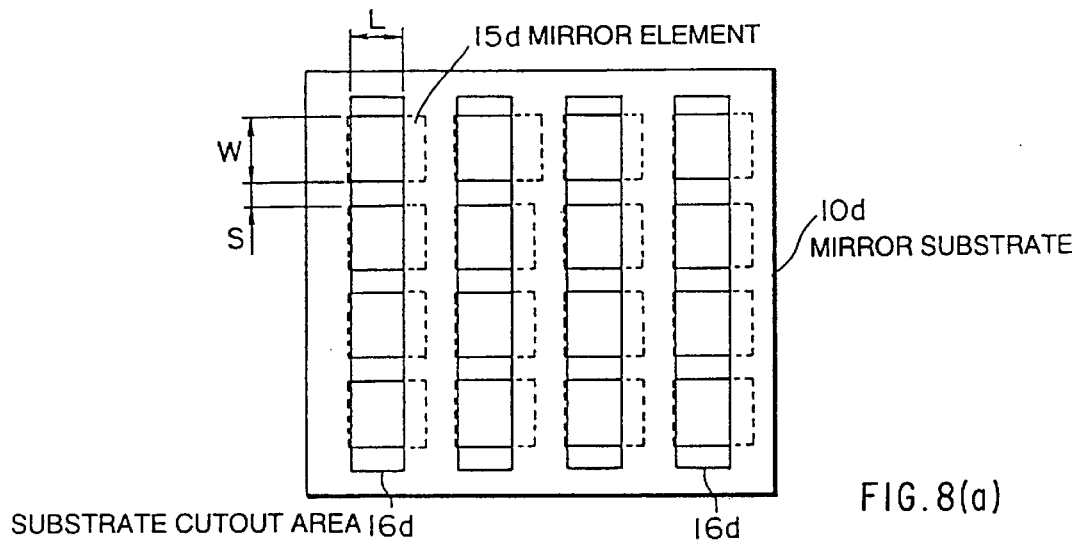
FIG. 8; Perspective view with its portions in cross section showing the structure of the optical modulator device of the fourth embodiment.
Figure 8B:
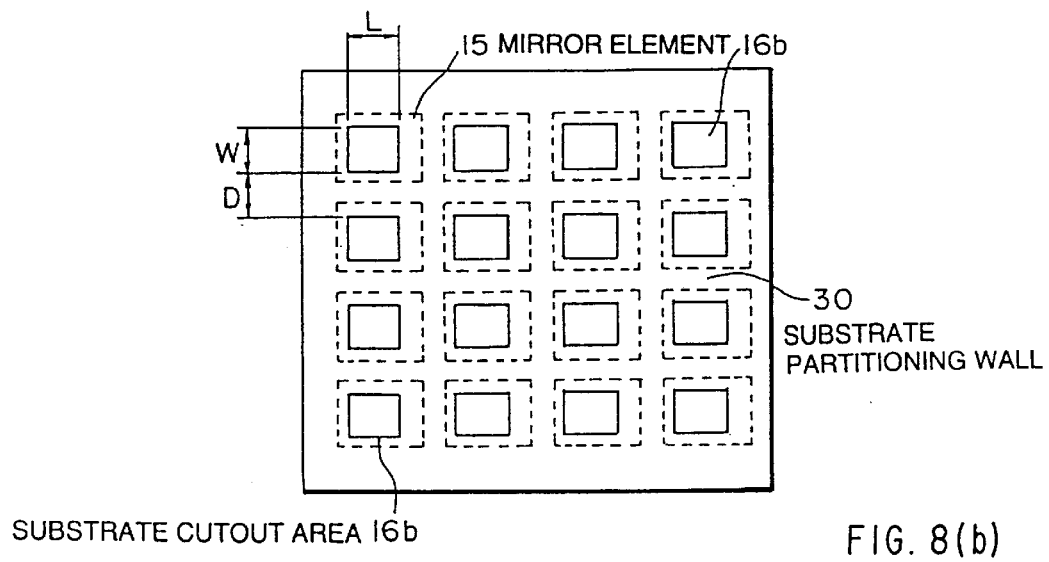

The advantage of the shape of the substrate cutout area in this embodiment is now discussed referring to FIG. 8. FIG. 8(a) is a front view of the substrate of this embodiment, viewed from the side of the substrate cutout area. Broken lines represent the positions of the mirror elements. FIG. 8(b) is a front view of he substrate with each substrate cutout area arranged on a per mirror element basis, viewed from the side of the substrate cutout area. As shown in FIGS. 8(a) and 8(b), for ease of visualization, the mirror elements are shown as a two-dimensional array of 4×4 elements. Actual substrates, however, are constructed of a two-dimensional array of 320×240 mirror elements.

As shown in FIG. 8(a), when the mirror elements 15 having a width W of 60 μm are arranged with an interval S of 2 μm introduced therebetween and with the substrate cutout area 16d having a width L of 60 μm wide, the effective area of each mirror element working as a reflective area is (W×L)/((W+S)×L)=0.97.

As shown in FIG. 8(b), when one substrate cutout area 16 is arranged on a per mirror element 15 basis, the four sides of each mirror element 15 is restrained. For this reason, partitioning walls 30 are needed. When the substrate cutout area 16 has a width W of 60 μm and a length L of 60 μm and the partitioning wall has a width D of 50 μm across, the effective area working as a reflective area is (W×L)/((W+S)×L)=0.50.

According to the fourth embodiment, by making a plurality of mirror elements share one common substrate cutout area, the interval between adjacent mirror elements is reduced, and the area working as a mirror is increased.

Given that the effective area of the mirror element remains unchanged, the overall size of the optical modulator device is made compact.

In crystalline substrates such as a silicon substrate, linear grooves are easily etched away taking advantage of a plane-selective etch rate.

Fifth Embodiment

In a fifth embodiment of the present invention, the light ray that is modulated through the optical modulator device of any of the preceding embodiments is shaded to improve the contrast of an image displayed.

Figure 9:
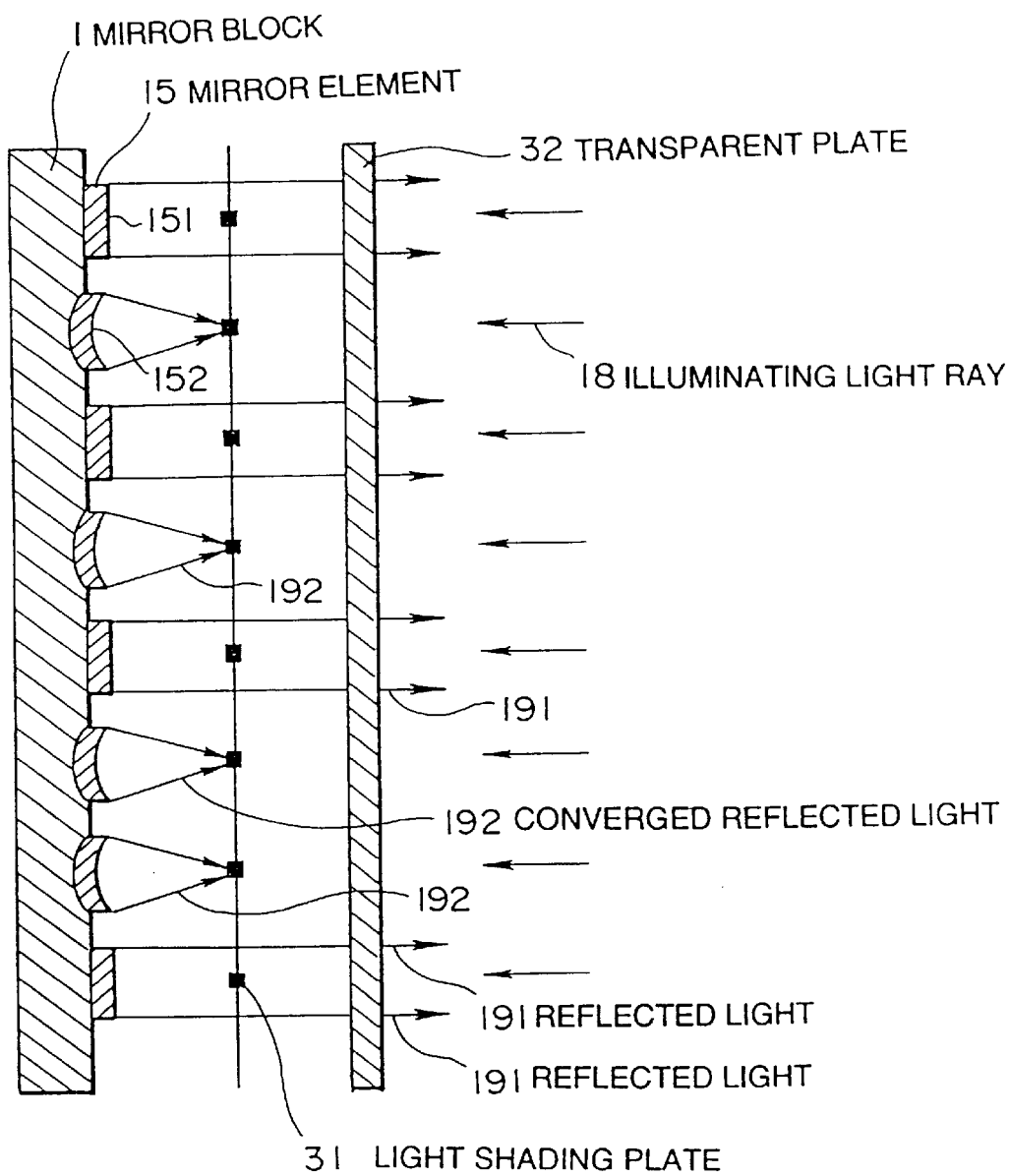
FIG. 9; Cross-sectional view showing the operation of the optical modulator device according to a fifth embodiment of the present invention.

FIG. 9 is a cross-sectional view showing the structure of an optical modulator device 104 of the fifth embodiment. For ease of visualization, FIG. 9 shows a simplified structure of a mirror block with a reduced number of mirror elements. The mirror block 1 may be any of mirror blocks 1a, 1b, 1c, and 1d in the respective optical modulator devices described above. The mirror 1, however, requires that each mirror element be deformed in a concave opened to the incident light. By inverting the polarity of the voltage applied to the piezoelectric layer but within the voltage range where the polarization direction of the piezoelectric layer 13 remains noninverted, the mirror element may be deformed in a concave opened to the substrate cutout area 16.

In the optical modulator device 104 of this embodiment, a light shading plate 31 is arranged at a focal point of the concave formed by each mirror element 15. This miniature light shading plate 31 corresponds to each mirror element, and when the mirror elements 15 are arranged in a matrix, for example, the light shading plates 31 are arranged in a matrix as well. To protect the light shading plates 31, a transparent plate 32 is arranged on the light incident side of the device.

The optical modulation operation of the optical modulator device 104 of this embodiment is now discussed. Parallel illuminating light rays 18 incident on the optical modulator device 104 are reflected by the undeformed mirror elements 151, as a reflected light ray 191, to be used for image displaying. In contrast, the mirror elements 152 that are deformed by the voltage applied converge the illuminating light ray 18 into a reflected light ray 192, focusing it at the position of each light shading plate 31, and the reflected light ray 192 is blocked by each light shading plate 31. The reflected light ray is not projected outwardly, and the pixel corresponding to the mirror element 152 is at an off-displayed state. Namely, the on and off state of the pixel is controlled by applying and removing the voltage to and from the mirror element 15.

In this embodiment, as long as the mirror element serves the light shading function, its planar shape may be not only rectangular but also be circular, elliptical, polygonal or in other shape.

According to the fifth embodiment, as described above, the use of the light shading plates in the optical modulator device controls a contrast drop of an image displayed due to diffuse reflected light.

Specific examples of the light shading plates 31 shown in FIG. 9 are now discussed. In the following discussion of the examples, for simplicity, the mirror elements 15 are assumed to be a matrix of 3×3 elements.

EXAMPLE 1

Figure 10:
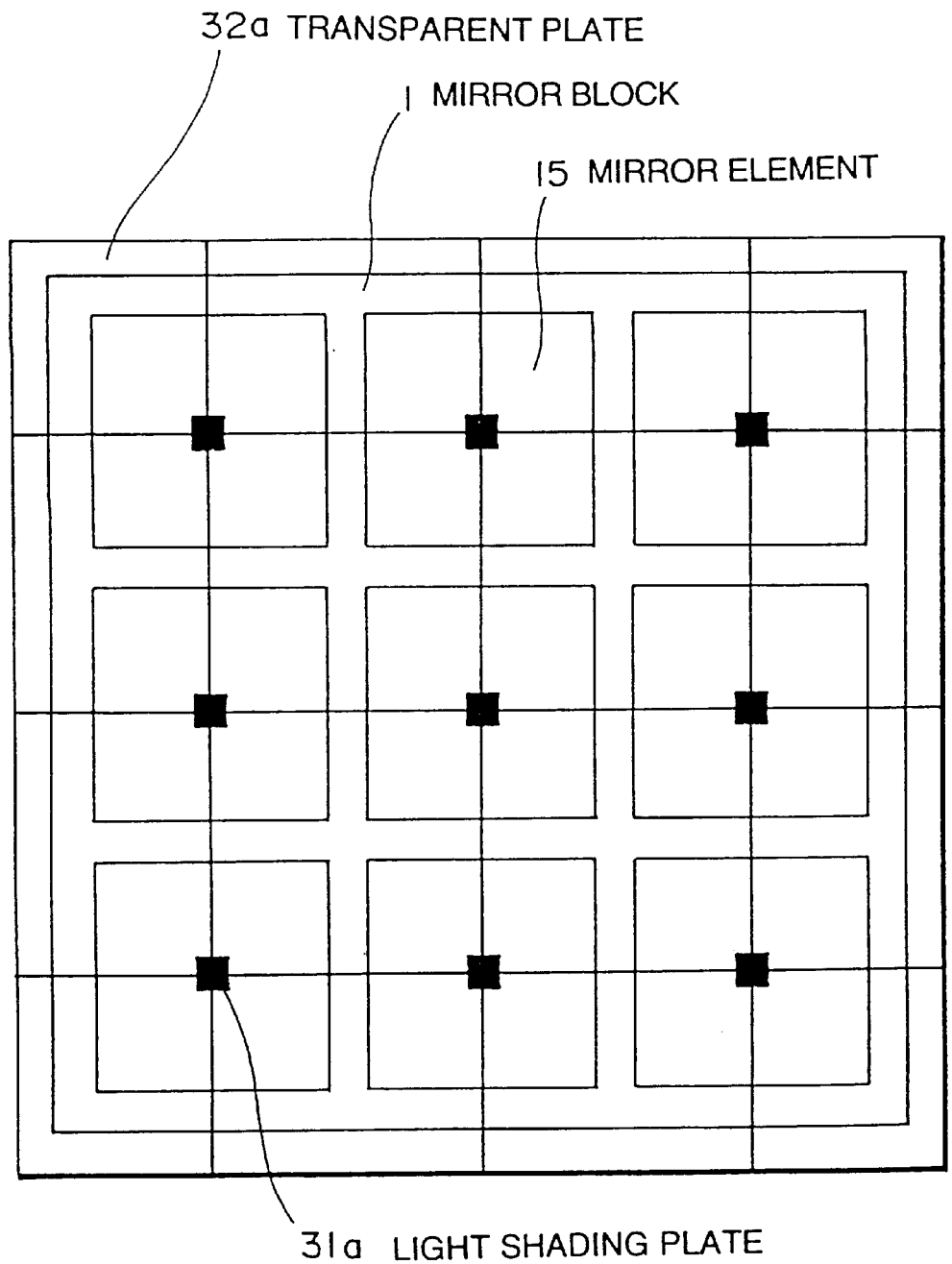
FIG. 10; Front view showing a light shading plate of a first example of the fifth embodiment.

FIG. 10 is a front view showing light shading plates 31a of a first example. The mirror block 1 nay be any of mirror blocks 15, 15b and 15d in the first, second and fourth embodiments, respectively.

As shown, the miniature light shading plates 31a corresponding to the mirror elements 15 are arranged in a matrix in front of the mirror block 1. The light shading plates 31a are formed by stamping a sheet metal of chromium or the like that does not transmit light, in a shape as shown in FIG.

10, using a press or the like. The sheet metal is arranged in a space as shown in FIG. 9.

According to the first example, a good light shading effect is achieved by the metal such as chromium or the like. Since the light shading plates are formed in a unitary body by stamping, manufacturing them is easy.

EXAMPLE 2

Figure 11:
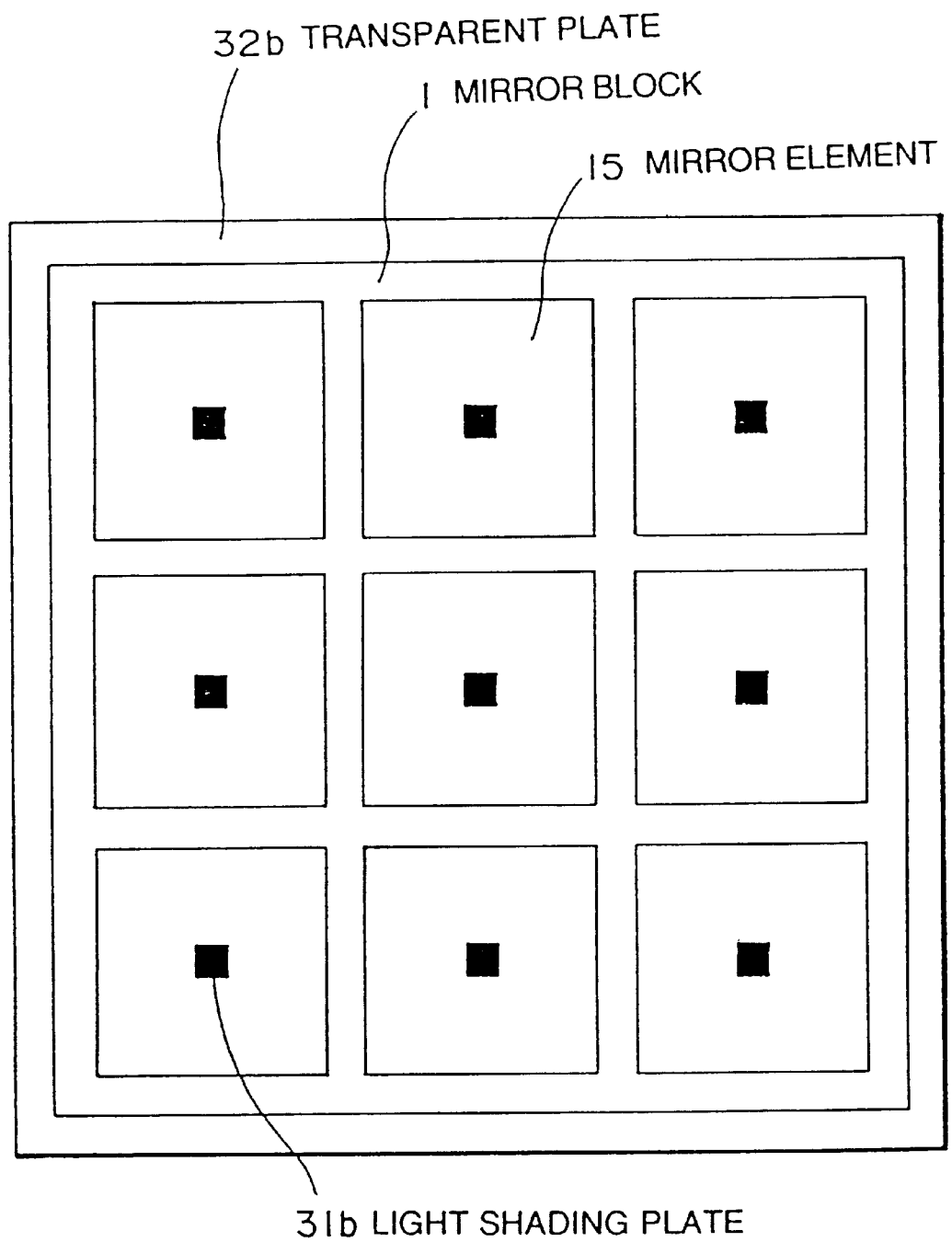
FIG. 11; Front view showing a light shading plate of a second example of the fifth embodiment.

FIG. 11 is a front view showing light shading plates 31*b* of a second example. As shown, the mirror elements 15 formed on a mirror block are rectangular. As the mirror block 1, the one in the first example may be used.

In the second example, an opaque material such as chromium is deposited or printed on a transparent plate 32*b* to form the light shading plates 31*b* in a predetermined shape thereon.

According to the second example, the light shading plates are formed integrally with the transparent plate, and adjustment of the positions of the light shading plates is easy. Manufacturing them is also easy.

EXAMPLE 3

Figure 12:
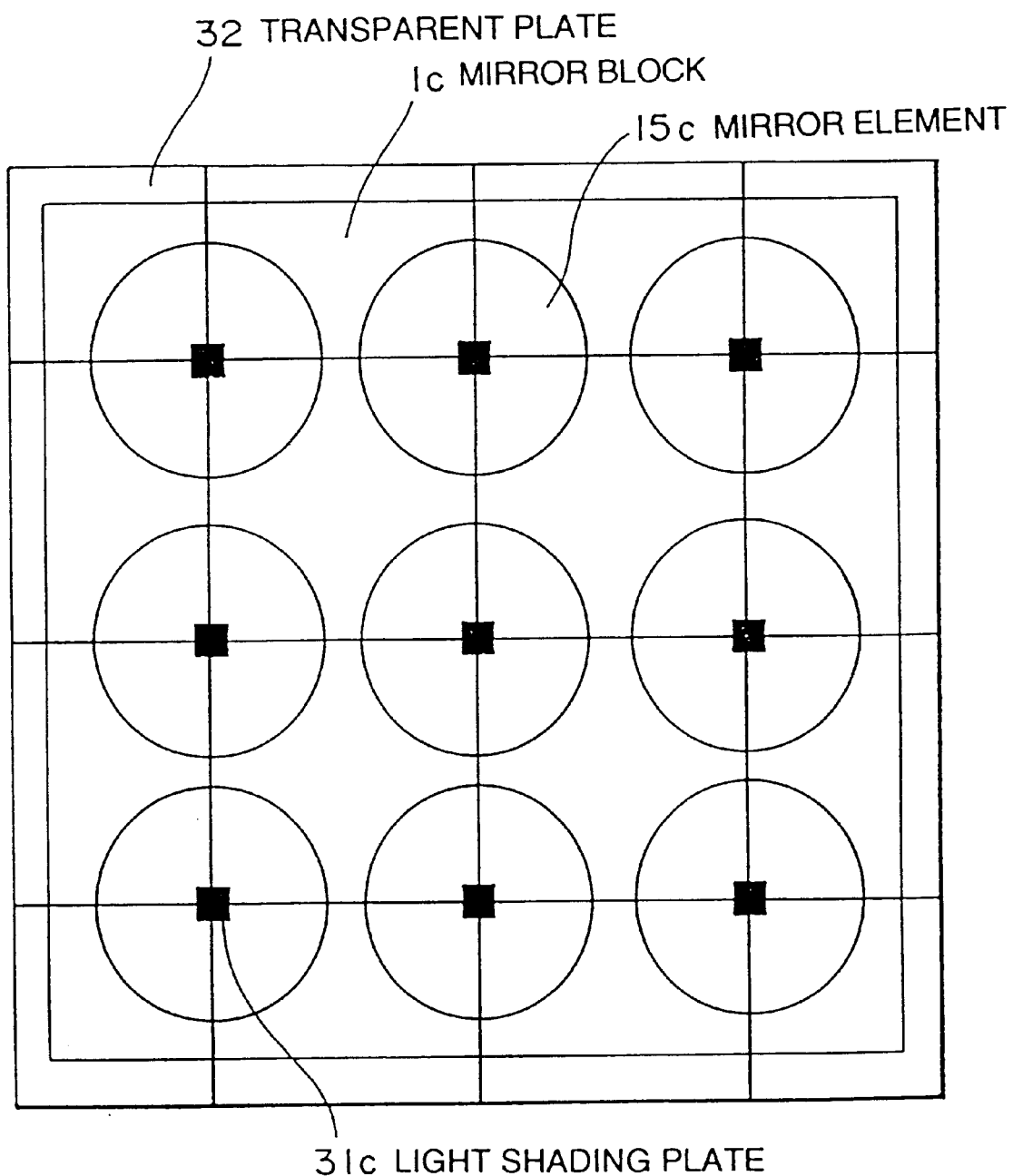
FIG. 12; Front view showing a light shading plate of a third example of the fifth embodiment.

FIG. 12 is a front view showing light shading plates 31*c* of a third example. As the mirror block 1, the mirror block 1*c* having the circular mirror elements 15 in the third embodiment is used.

As in the first example, this example employs miniature light shading plates 31*c* arranged in a matrix corresponding to the mirror elements 15, in front of the mirror block 1. The light shading plates 31*c* are also manufactured by stamping the same material as in the first example.

According to the third example, the light shading plates are arranged regardless of the planer shape of the mirror elements.

EXAMPLE 4

Figure 13:
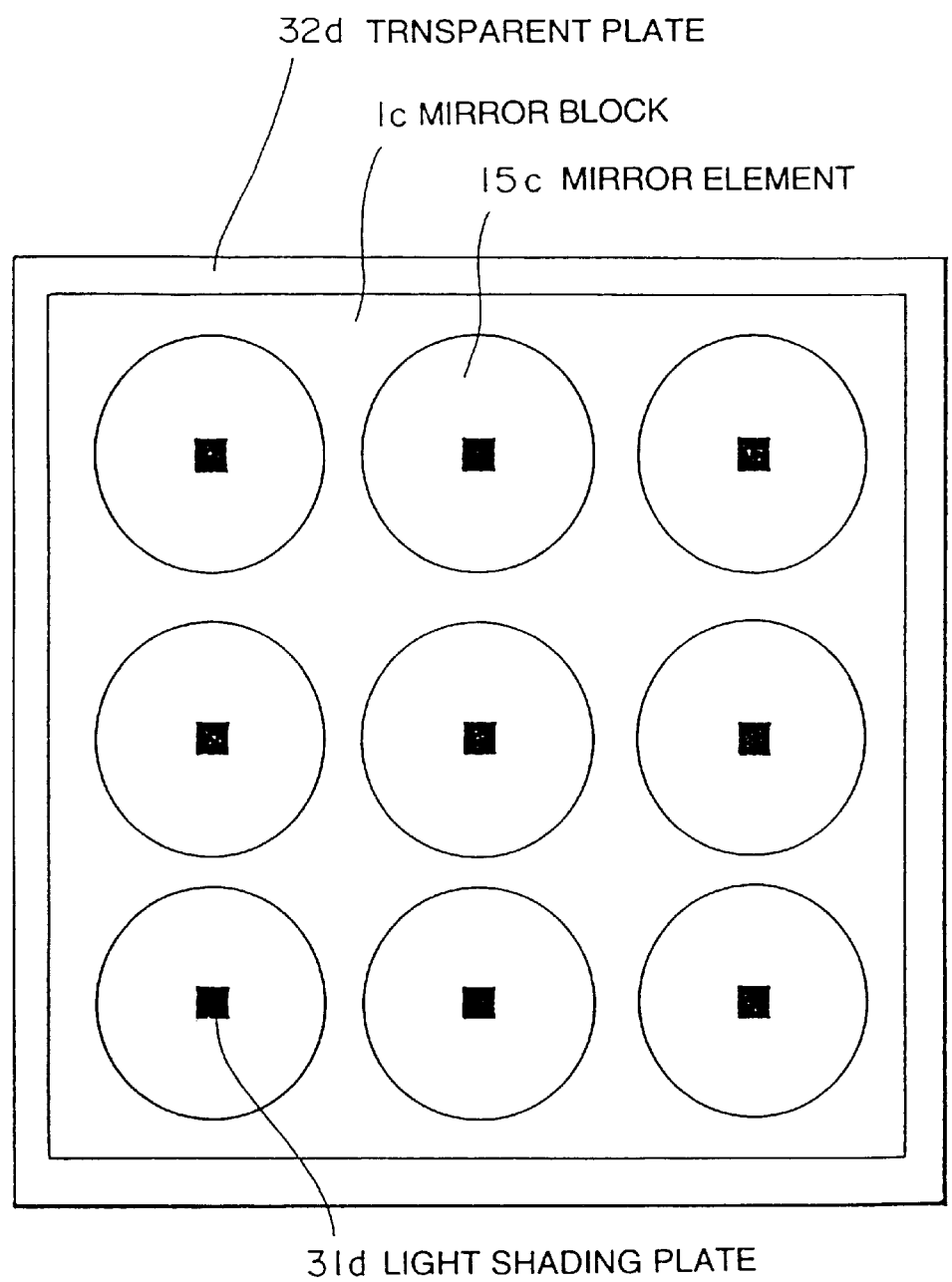
FIG. 13; Front view showing a light shading plate of a fourth example of the fifth embodiment.

FIG. 13 is a front view showing light shading plates 31*d* of a fourth example. As the mirror block 1, the mirror block having the circular mirror elements 15*c* in the third example is used.

As in the second example, this example employs an opaque material such as chromium that is deposited or printed on a transparent plate 32*d* to form the light shading plates 31*d* in a predetermined shape thereon.

Embodiment 6

A sixth embodiment of the present invention relates to a display unit in which one of the optical modulator devices in the first through fourth embodiments is employed.

Figure 14:
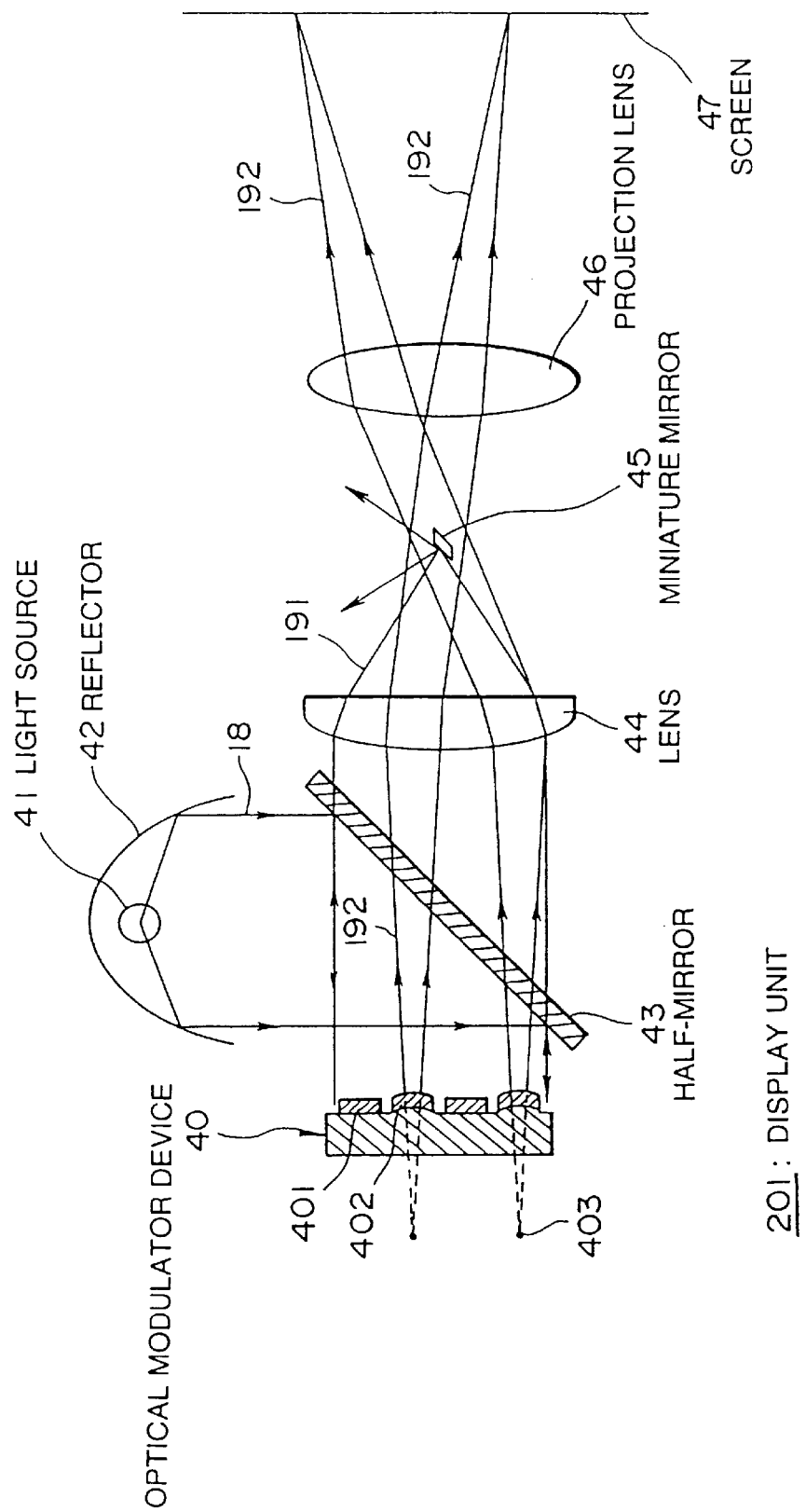
FIG. 14; Cross-sectional view showing the construction of a display apparatus according to a sixth embodiment of the present invention.

FIG. 14 is a cross-sectional view showing the construction of a display apparatus (projector) according to the sixth embodiment. FIG. 14 shows the cross section of optical components taken along the optical axis of an illuminating light ray.

As shown, the display unit 201 of this embodiment comprises an optical modulator device 40, a light source 41, a reflector 42, a half-mirror 43, a lens 44, a miniature mirror 45 and a projection lens 46. The optical modulator device 40 may be any of the optical modulator devices in the first through fourth embodiments and other embodiments. However, it is required that, in the structure of the optical modulator device, the mirror elements be deformed in a convex projecting to the incident illuminating light ray.

The optical modulation operation of the display unit 201 of this embodiment is now discussed. The illuminating light rays 18 emitted from a metal halide lamp as the light source 41 are reflected off the parabolic reflector 42, and thus converted into substantially parallel light rays. It is also acceptable to use a lens or a combination of a lens and a reflector to covert illuminating light rays into parallel light rays. The illuminating parallel light rays are deflected by the half-mirror 43, and then reaches the optical modulator device 40. The half-mirror 43 may be replaced with a cubic half-prism.

Undeformed mirror elements 401, out of the mirror elements constituting the optical modulator device 40, have a substantially flat reflective surface. The illuminating light rays 18 incident on the mirror elements 401 are reflected in parallel (191), transmitted through the half-mirror 43, and then converged on the miniature mirror 45 by the lens 44. The miniature mirror 45 is placed at the focal point of the lens 44. Since the miniature mirror 45 is arranged such that its reflective surface is tilted at 45° with respect to the optical axis of the lens 44, all reflected light rays 192 from the undeformed mirror elements 401 are reflected by the miniature mirror 45, and remain unable to reach the projection lens 46. Therefore, the pixels corresponding to the undeformed mirror elements 401 are not displayed. The reflective surface of the miniature lens 45 is sized to a minimum dimension but needs to be still large enough to block entirely the reflected light rays 191 from the optical modulator device when all mirror elements of the optical modulator device 40 work as undeformed mirrors.

Deformed mirror elements 402, on the other hand, work as a convex mirror. Reflected light rays 192 therefrom become divergent light rays as if they were emitted from imaginary points 403 of emission by the convex mirrors and are transmitted through the lens 44, and pass about the miniature mirror 45. The reflected light rays 192 reach the projection lens 46 to be focused into an image on a screen 47.

When all mirror elements constituting the optical modulator device 40 remain undeformed, all reflected light rays 191 are reflected by the miniature mirror 45, and no image is projected on the screen 47, and a dark state display is presented on the screen 47. The reflected light rays 192 from the mirror elements selected according to an image to be displayed is projected on the screen 47, and the bright image is presented on the dark background.

In the above arrangement, with the optical modulator device 40 having a dimension of about 33 mm (1.3 inches) diagonally thereacross, a projected image is enlarged on the screen 47 having a dimension of about 1.5 m (60 inches) diagonally thereacross. Depending on the design of the projection lens, a display unit in a wide range of magnification may be provided.

Instead of the miniature mirror 45, another optical system may be considered where a pinhole is arranged in the vicinity of the focal point of the lens 44 so that the pinhole transmits the reflected light rays 191 from undeformed, substantially flat mirror elements 401 while blocking the reflected light rays 192 from convex-deformed mirror elements 402.

In such a case, when all mirror elements constituting the optical modulator device 40 remain undeformed, all reflected light rays 192 transmit through the pinhole and are then projected on the screen 47 by the projection lens 46, brightening the screen 47. The reflected light rays 192 from the mirror elements selected according to an image to be displayed partly transmit the pinhole but most of them are blocked by the periphery of the pinhole, being unable to reach the screen 47. Therefore, the dark image appears on the light background.

To present color display, as known in the prior art, a rotating color filter disk having three color divisions of red, green and blue is arranged between the reflector 42 and the lens 44, or alternatively, color filter layers of red, green and blue are formed on the front of the mirror elements constituting the optical modulator device 40.

Depending on the function of the projection lens 46, a diversity of display units including a projection display, a viewfinder for a video camera, and a headmount display may be provided.

According to the display unit of the sixth embodiment, as described above, the optical modulator device of the present invention is used as a display device, and the contrast drop due to irregularly reflected light is controlled. Since the amount of deformation of the mirror element depends on the voltage applied to the piezoelectric layer, it is possible to control the radius of curvature of the convex surface of the mirror element deformed by the voltage applied to the piezoelectric layer. Since the quantity of light passing about the miniature mirror 45 is controlled, the brightness of an image on the screen can be continuously controlled.

Seventh Embodiment

A seventh embodiment of the present invention provides a display unit having a construction different from that of the preceding sixth embodiment.

Figure 15:
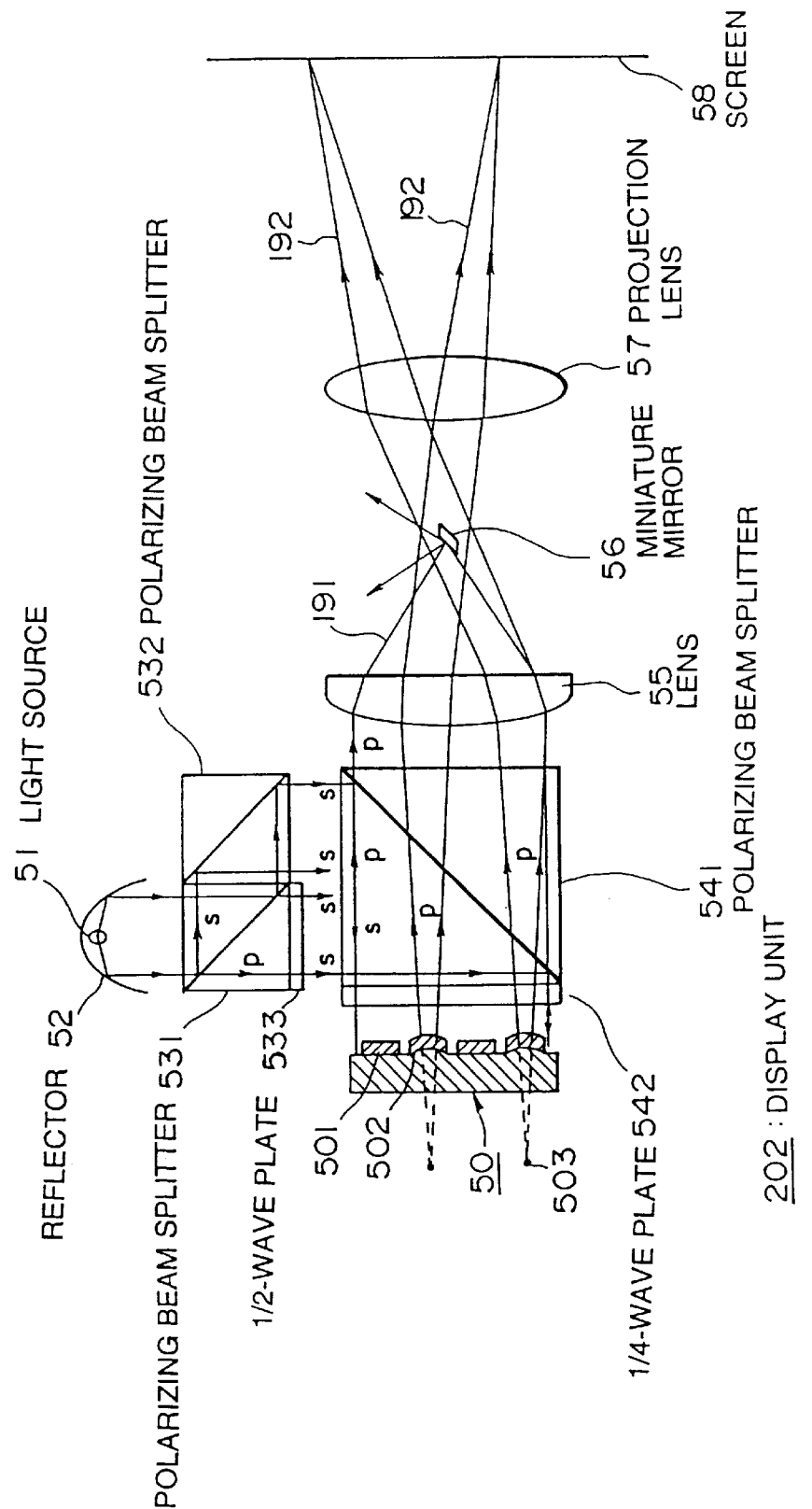
FIG. 15; Cross-sectional view showing the construction of a display apparatus according to a seventh embodiment of the present invention.

FIG. 15 is a cross-sectional view snowing the construction of a display apparatus (projector) according to the seventh embodiment. FIG. 14 shows the cross section of optical components taken along the optical axis of an illuminating light ray.

As shown, the display unit 202 of the sixth embodiment comprises a light source 51, a reflector 52, polarizing beam splitters 531, 532, 541, a ½-wave plate 533, a ¼-wave plate 542, an optical modulator device 50, a lens 55, a miniature mirror 56 and a projection lens 57. The letters "s" and "p" next to arrows shown identify whether the light ray represented by the respective arrow is s-polarized or p-polarized. The beam splitters 531, 532 and 541 transmit p-polarized light but reflect s-polarized light.

The optical modulation operation of the display unit 202 of this embodiment is now discussed. Illuminating light rays 18 emitted from a metal halide lamp as the light source 51 are reflected off the parabolic reflector 52, converted into parallel light rays, and directed to the first polarizing beam splitter 531. The illuminating light rays from the light source 51 are natural light rays which are random in polarization directions. Of the incoming light rays, p-polarized light rays are transmitted through the first polarizing beam splitter 531, while s-polarized light rays are reflected therefrom. The reflected s-polarized light rays are directed to the second polarizing beam splitter 532 next to the first polarizing beam splitter 531. The second polarizing beam splitter 532 reflects the s-polarized light rays and projects them outwardly.

The p-polarized light rays transmitted through the first polarizing beam splitter 531 are converted into p-polarized light rays through the ½-wave plate 533 that is attached to the output face of the first polarizing beam splitter 531. For this reason, light rays incident on the third polarizing beam splitter 541 are all s-polarized light rays.

The s-polarized light rays incident on the third polarizing beam splitter 541 are all reflected toward the optical modulator device 50. In this process, the s-polarized light rays are converted into circularly polarized light rays through the ¼-wave plate 542 attached to the face of the third polarizing beam splitter 541 looking to the optical modulator device side.

Light rays reflected from the reflective surfaces of the mirror elements of the optical modulator device 50 are converted into circularly polarized light rays that rotate in the direction opposite to the direction of the incident circularly polarized light rays. The resulting circularly polarized light rays are converted into p-polarized light rays through the ¼-wave plate 542, and then introduced into the third polarizing beam splitter 541. The p-polarized light rays are all transmitted through the polarizing beam splitter 541 without being reflected, and reach the lens 55.

Reflective light rays 191 from undeformed mirror elements 501 of the optical modulator device 50 are all collected at the miniature mirror 56. Since the miniature mirror 56 is arranged so that its reflective surface is tilted at 45° with respect to the optical axis of the lens 55, all reflected light rays 191 from the undeformed mirror elements 501 are reflected by the miniature mirror 56, and remain unable to reach the projection lens 57. Therefore, the pixels corresponding to the undeformed mirror elements 501 are not displayed. The size consideration for the miniature mirror in the sixth embodiment is also applicable to the size of the reflective surface of the miniature lens 56.

Deformed mirror elements 502, on the other hand, work as a convex mirror. Reflected light rays 192 therefrom become divergent light rays as if they were emitted from imaginary points 503 of emission by the convex mirrors and are transmitted through the lens 55, and pass about the miniature mirror 56. The reflected light rays are transmitted through the projection lens 57 to be focused into an image on a screen 58. Therefore, the pixels of deformed mirror elements 502 are displayed.

As described above, according to the seventh embodiment, the optical modulator device of the present invention is used as a display device, and the contrast drop due to irregularly reflected light is controlled. By aligning the directions of oscillation of the light rays emitted from the light source, energy radiated from the light source is directed to the screen without loss. As a result, a display unit capable of presenting a bright image is provided.

This embodiment may employ a pinhole to improve the contrast of the displayed image the same way the sixth embodiment does. Furthermore, this embodiment may be applied to a color display unit using color filters or the like.

Eighth Embodiment

An eighth embodiment relates to a display unit incorporating an optical modulator device that is deformed in a concave, instead of the optical modulator devices of the sixth and seventh embodiments that are deformed in a convex.

Figure 16:
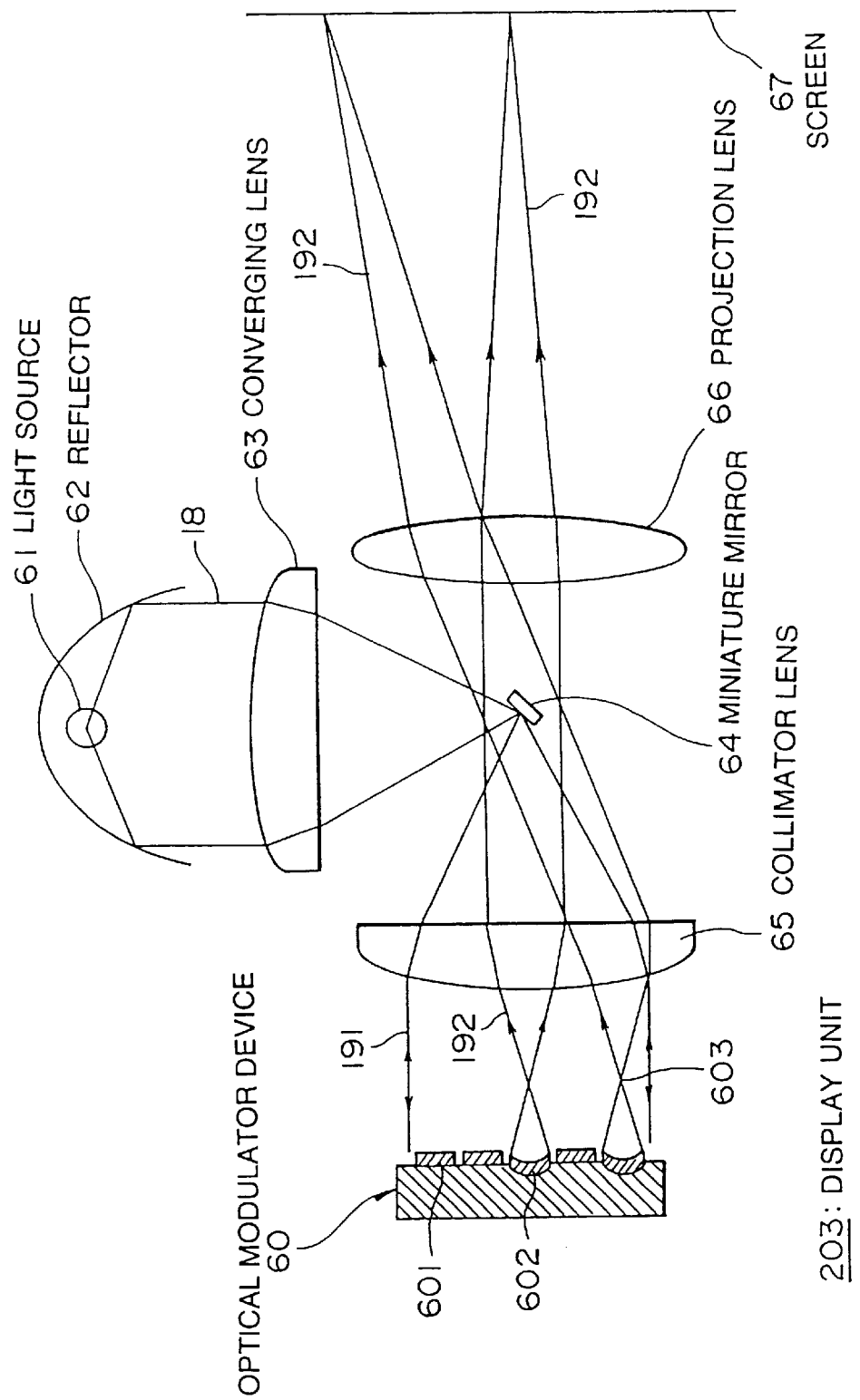
FIG. 16; Cross-sectional view showing the construction of a display apparatus according to an eighth embodiment of the present invention.

FIG. 16 is a cross-sectional view showing the construction of a display apparatus (projector) according to the eighth embodiment. FIG. 16 shows the cross section of optical components taken along the optical axis of an illuminating light ray.

As shown, the display unit 203 of this embodiment comprises an optical modulator device 60 a light source 61, a reflector 62, a converging lens 63, a miniature mirror 64, a collimator lens 65, and a projection lens 66. The optical modulator device 60 may be any of the optical modulator devices of the first through fourth embodiments and other embodiments. However, it is required that, in the structure of the optical modulator device, the mirror elements be deformed in a concave open to the incident illuminating light ray.

In the optical modulator device 60, its reflective surfaces are deformed in a concave with a voltage applied. The light rays reflected from deformed mirrors 602 form image points 603 to the collimator lens side viewed with respect to the optical modulator device 60.

The optical modulation operation of the display unit 203 of this embodiment is now discussed. The illuminating light rays 18 emitted from the light source 61 are reflected from the reflector 62, and converged at the miniature mirror 64 through the converging lens 63. Since the miniature mirror 64 is tilted at 45° with respect to the optical axis of the lens 63, all illuminating light rays 18 are diverged and directed to the collimator lens 65. The collimator lens 65 converts the illuminating light rays 18 into parallel light rays, which are then directed to the optical modulator device 60 at right angles thereto.

Since undeformed mirror elements 601 out of the mirror elements constituting the optical modulator device 60 have a substantially flat reflective surface, the reflected light rays 191 are incident on the collimator lens 65 as parallel light rays. They are converted and reflected at the miniature mirror 64, and are unable to reach the projection lens 66. The pixels corresponding to the undeformed mirror elements are not displayed on a screen 67.

The reflective surface of the miniature lens 64 is sized to a minimum dimension but needs to be still large enough to block entirely the reflected light rays 191 from the optical modulator device when all mirror elements of the optical modulator device 60 work as undeformed mirrors.

Since deformed mirror elements 602 work as a concave mirror, reflected light rays 192 therefrom are directed to the collimator lens 65 via the image points 603. The reflected light rays 192 are converted into substantially parallel rays through the collimator lens 65, pass about the miniature mirror 64 without being blocked by it, and are transmitted through the projection lens 65 to form an image on the screen 67.

When all mirror elements constituting the optical modulator device 60 remain undeformed in the above arrangement, all reflected light rays 191 are reflected by the miniature mirror 64, unable to reach the screen 67, and thus a dark state display is presented on the screen 67. The reflected light rays 192 from the mirror elements 602 selected according to an image to be displayed is projected on the screen 67, and the bright image is presented on the dark background on the screen 67.

To present color display, as known in the prior art, a rotating color filter disk having three color painted divisions of red, green and blue is arranged between the reflector 62 and the converging lens 63, or alternatively, color filter layers of red, green and blue are formed on the front of the mirror elements constituting the optical modulator device 60.

Depending on the function of the projection lens 66, a diversity of display units including a projection display, a viewfinder for a video camera, and a headmount display may be provided.

According to the display unit of the eighth embodiment, as described above, an excellent display unit is provided even when the mirror elements of the optical modulator device are deformed in a concave open to the incident illuminating light rays. Since the amount of deformation of the mirror element depends on the voltage applied to the piezoelectric layer, the applied voltage can be used to control the radius of curvature of the concave surface of the mirror element. Since the quantity of light passing about the miniature mirror is controlled, the brightness of an image on the screen can be continuously controlled.

Since the optical modulator device of this embodiment has no discontinuous sections in the reflective layers that exist in the prior art optical modulator device using tilted mirrors, a display unit with reduced irregular light rays and enhanced contrast is provided.

Ninth Embodiment

A ninth embodiment of the present intention relates to an optical modulator unit that achieves a high utilization of light, presenting a bright image.

Figure 17:
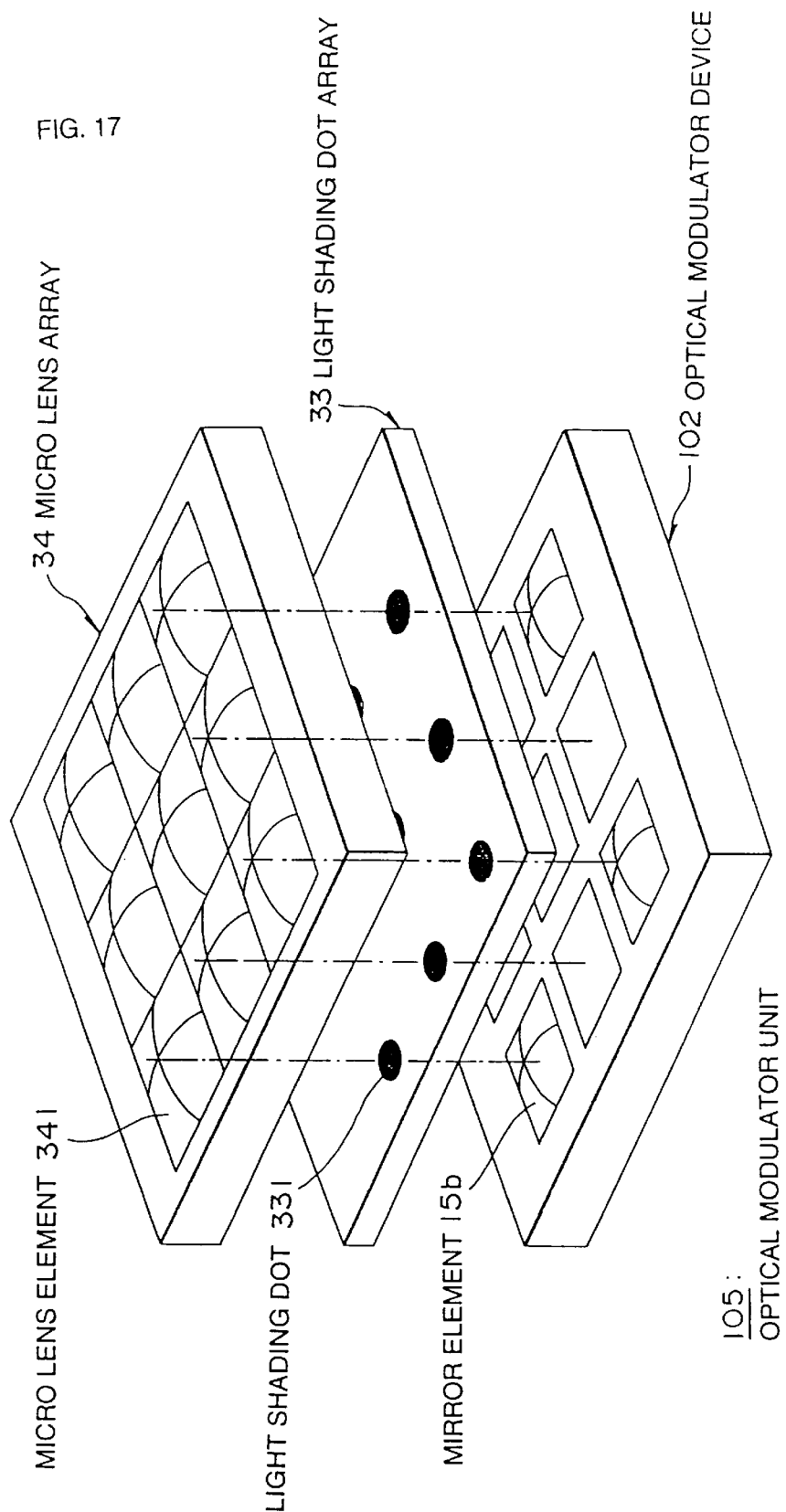
FIG. 17; Perspective view showing the construction of an optical modulator unit according to a ninth embodiment of the present invention.
Figure 18:
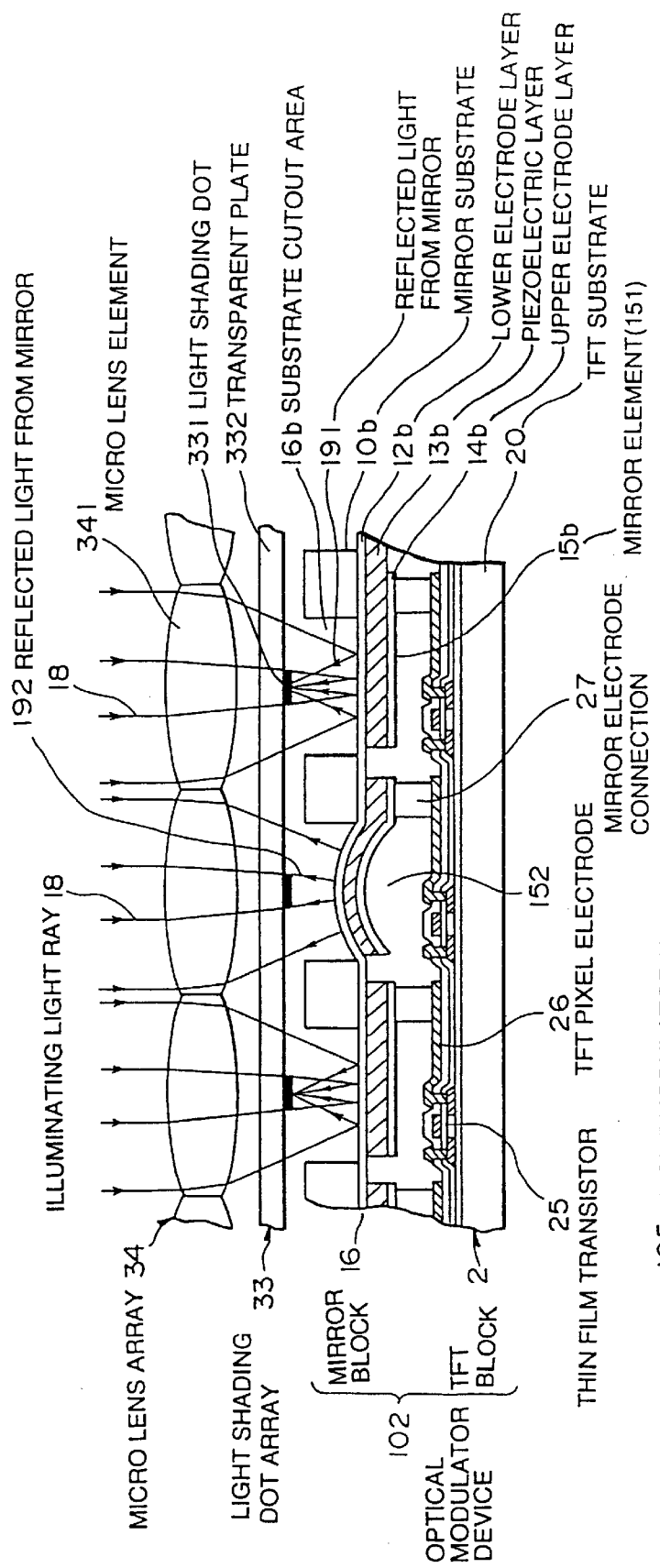
FIG. 18; Cross-sectional view showing the construction of an optical modulator unit according to the ninth embodiment of the present invention.

FIG. 17 is a perspective view showing generally the optical modulator unit of the ninth embodiment. FIG. 18 is a cross-sectional view of part of the optical modulator unit. To help understand the structure of the optical modulator unit, the number of mirror elements are reduced as shown in these figures. The optical modulator unit 105 comprises an optical modulator device 102, a light shading dot array 33 and a micro lens dot array 34. These components are fixed in parallel with predetermined spacings therebetween by an unshown mounting mechanism.

The optical modulator device 102 is the one used in the second embodiment, and is provided with the mirror elements 15b. Other optical modulator devices may be used instead of the optical modulator device 102, as long as they employ the mirror elements that are deformable in a convex projecting to the incident light rays.

The light shading dot array 33 is arranged by forming light shading dots 331 on a transparent plate 332. The transparent plate 332 is made of glass, resin or the like having transparent property and a thickness of 0.5 mm or so. The light shading dots 331 are a circular pattern that is formed of a light absorbing material such as carbon black, black pigment, and black dye. The light shading dot pattern is not limited to a circle, and it may be elliptical or rectangular in consideration of the converging state of the reflected light from the mirror elements.

The micro lens array 34 is provided with a plurality of micro lens elements 341. The optical axis of each micro lens element 341 is set and secured to be collinear with the center axis of the respective light shading dot 331 in the light shading dot array 33 and the optical axis of the respective mirror element 15b in the optical modulator device 102. The micro lens array 34 is formed using a diversity of manufacturing processes including a thermal press molding with glass as molding compound, an injection molding with a transparent resin such as acrylic resin as a molding compound, and a molding in which a die having a lens configuration is pressed on a resin applied on the surface of a glass substrate for transferring the lens configuration. Although FIG. 18 shows boundary lines between micro lens elements 341 in the micro lens array 34, in practice the micro lens array 34 is integrally formed in a unitary body without such boundary. The micro lens array 34 is designed so that the lens surface of its micro lens elements may be cylindrical, toroidal, or non-symmetrical with respect to the optical axis, to match the shape of deformation of the mirror elements.

As shown in FIG. 18, the spacing between the micro lens array 34 and the optical modulator device 102 is adjusted such that the focal point of each micro lens element 341 approximately agrees with the center of the curvature of the sphere that is an approximation of the shape of deformation in the respective mirror element 15b (152). The position of the light shading dot array 33 is adjusted to agree approximately with a position where the reflected light rays 191 from the undeformed mirror elements 15b (151) are focused, namely, such that the optical path of the light rays, reflected from the micro lens elements 341 and reaching the light shading dots 331, approximately agrees with the focal length of the micro lens elements 341. The positions of the light shading dots 331 may be adjusted to be in the vicinities of the focal points of the micro lens elements 341 rather than exactly on the focal points of the micro lens elements 341, to increase the on-screen image contrast on the display unit to be described later.

The optical modulation operation of the optical modulator unit 105 of this embodiment is now discussed. As shown in FIG. 18, substantially parallel illuminating light rays 18 are converged at the micro lens elements 341 constituting the micro lens array 34, pass through the light shading dot array 33 to be incident on the mirror elements 15b in the optical modulator device 102.

The light rays 191 reflected from the undeformed mirror elements 151 are converged and substantially absorbed at the light shading dots 331, and unable to reach the micro lens array 34.

The light rays 192 reflected from the deformed mirror elements 152 return to the micro lens elements 341 along almost the same optical path the incident light rays took, because the focal point of the micro lens element 341 approximately agrees with the center of curvature of the respective mirror element 152, and then the reflected light rays 192 are converted back into substantially parallel light rays through the micro lens elements 341 to be output.

In this embodiment, the light shading dots 331 are arranged between the micro lens elements 341 and the mirror elements 15b, and thus each light shading dot 331 absorbs light rays covered with its corresponding area, out of the incident light rays coming in through the micro lens elements 341. For this reason, the area of the light shading dot 331 is preferably as small as possible. The image quality of the micro lens elements 341 is enhanced such that the reflected light rays from the undeformed mirror elements 151 are sufficiently absorbed by such small light shading dots. To this end, making the lens surface of the micro lens element 341 aspheric is effective. A more discussion about this will be given later.

According to the ninth embodiment, as described above, by arranging the micro lens array, the illuminating light rays are directed to deformable portions only, avoiding portions unable to be deformed (non-deformable portions), surrounding each of the mirror elements. Thus, an optical modulator unit with a high utilization of light results.

EXAMPLE

As for the external dimensions of the optical modulator unit 105 of the ninth embodiment, the external dimensions of the mirror element 15b constituting the optical modulator device 102 are 50 μm×50 μm, the pitch of the mirror elements 15b is 100 μm, the curvature of radius of a sphere into which the shape of deformation of the mirror element 15b in its deformed state is approximated is approximately 1 mm, the diameter of the light shading dot 331 is approximately 20 μm, the spacing between the reflective surface of the mirror element 15b and the light shading dot 331 is approximately 1 mm, the external dimensions of the micro lens element 341 constituting the micro lens array 34 are 100 μm×100 μm, the focal length of the micro lens element 341 is approximately 2.3 mm, and the spacing between the reflective surface of the mirror element 15b and the micro lens element 341 is approximately 1.3 mm.

Tenth Embodiment

A tenth embodiment of the present invention relates to a display unit in which the optical modulator unit in the ninth embodiment is incorporated.

Figure 19:
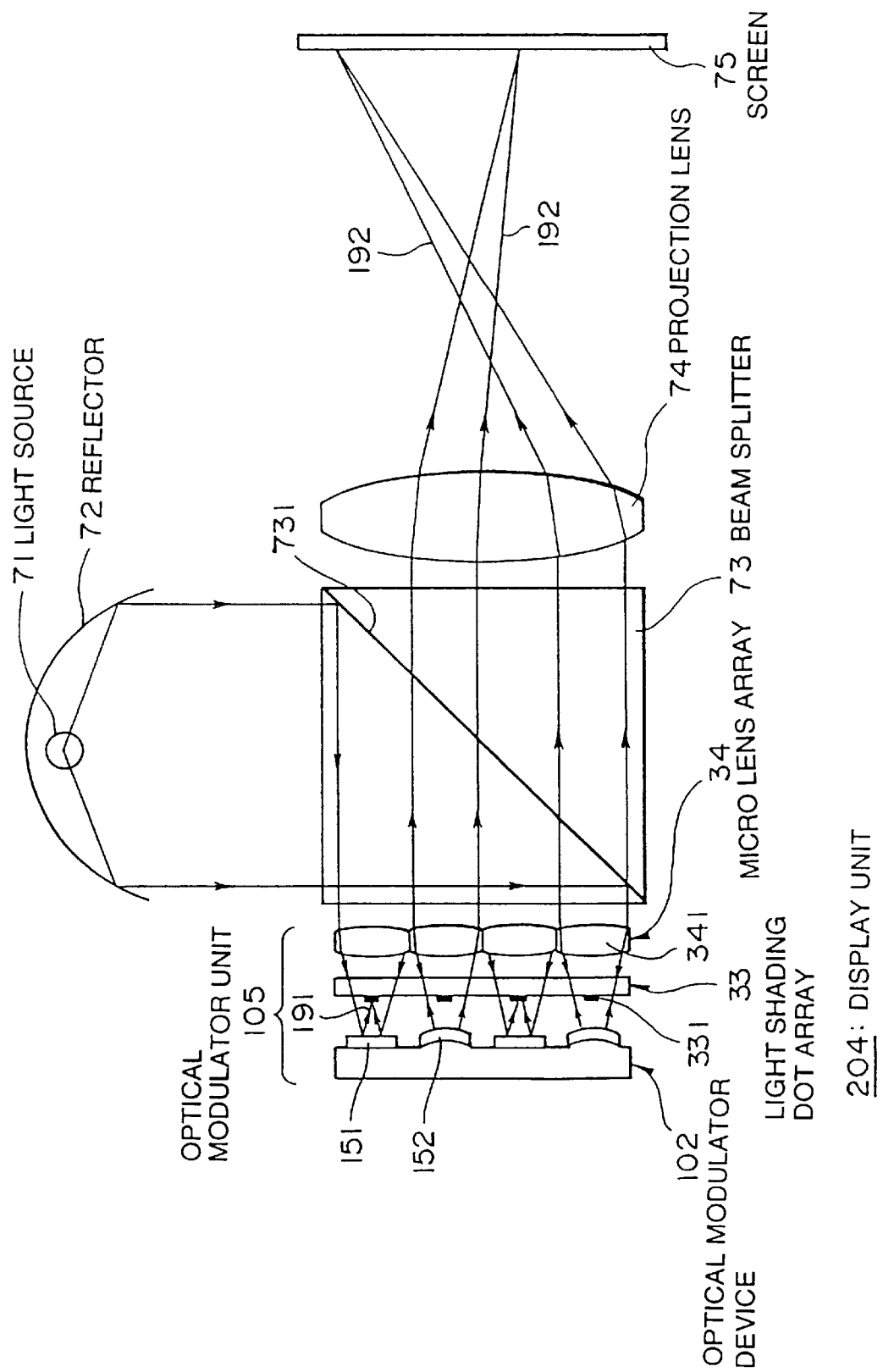
FIG. 19; Cross-sectional view showing the construction of a display apparatus according to a tenth embodiment of the present invention.

FIG. 19 is a cross-sectional view showing the construction of the display unit of this embodiment. FIG. 19 shows the cross section of optical components taken along the optical axis of an illuminating light ray. As shown, the display unit 204 of this embodiment comprises a light source 71, a reflector 72, a beam splitter 73, the optical modulator unit 105 in the ninth embodiment, and a projection lens 74.

The function of each constituting component remains unchanged from that already described in connection with preceding embodiments, and thus their description is omitted.

The operation of the display unit is now discussed. The light rays emitted from the light source 71 are converted into substantially parallel light rays through the parabolic-shaped reflector 72, and directed to the beam splitter 73. Part of these illuminating light rays are reflected off a reflective surface 731, and directed to the optical modulator unit 105.

As described in connection with the ninth embodiment, the illuminating light rays 18 incident on the undeformed mirror elements 151 become the reflected light rays 191, converged at and then absorbed by the light shading dots 331 in the light shading dot array 33, and unable to return to the beam splitter 73.

On the other hand, the reflected light rays 192 from the deformed mirror elements 152 are converter back into parallel light rays through the micro lens elements 341 in the micro lens array 34, returned to the beam splitter 73, and then focused on a screen 75 through the projection lens 74. As the screen 75, a reflective-type screen or transmissive-type screen is acceptable.

According to the tenth embodiment, as described above, the deformed state and undeformed state of the mirror element of the optical modulator unit are designed to correspond to on and off of the pixel on the screen to display an image thereon. The optical modulator unit of this embodiment achieves a high utilization of light, projecting a bright image on screen.

This embodiment may be applied to other arrangements. For example, the beam splitter 73 may be replaced with a polarizing beam splitter, and a polarizing conversion optical system may be attached to the side of the polarizing beam splitter on which an illuminating light ray is incident, to convert the illuminating light rays into linearly polarized light rays. Arranged between the polarizing beam splitter and the optical modulator unit 105 is a ¼-wave plate for converting the linearly polarized light rays into circularly polarized light rays, or the circularly polarized light rays into the linearly polarized light rays (for its operation, reference is made to the discussion of a sixteenth embodiment later).

In such an arrangement, an even brighter image is displayed because most of the illuminating light rays incident on the polarizing beam splitter are supplied to the optical modulator unit 105.

Eleventh Embodiment

An eleventh embodiment of the present invention relates to an optical modulator unit that presents a bright image with a construction different from the one in the ninth embodiment.

Figure 20:
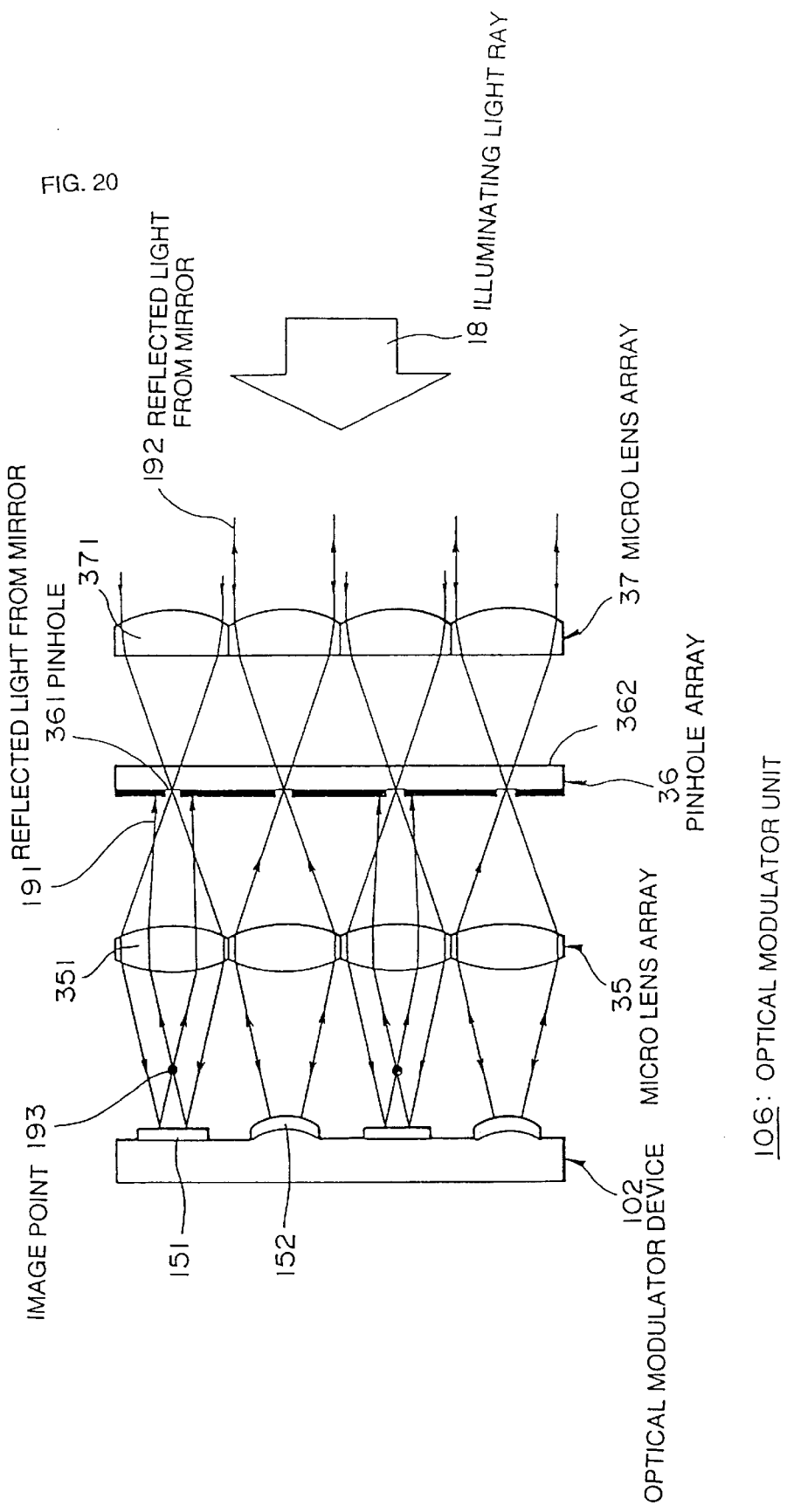
FIG. 20; Cross-sectional view showing the construction of an optical modulator unit according to an eleventh embodiment of the present invention.

FIG. 20 is a cross-sectional view of the optical modulator unit of this embodiment. As shown, to help understand the structure of the optical modulator unit, four mirror elements only are shown. Although FIG. 20 shows boundary lines between micro lens elements in micro lens arrays 35, 37, in practice these arrays are integrally formed in a unitary body without such boundary.

The optical modulator unit 106 comprises the optical modulator device 102, the micro lens array 35, a pinhole array 36, and the micro lens array 37.

The pinhole array 36 is made of a 0.5 mm thick transparent plate of glass or resin. Pinholes 361 are produced by forming a light absorbing film entirely on one side of the pinhole array 36 and creating fine openings therein using photolithographic techniques or other techniques. The micro lens array 35 and the micro lens array 37 have the structure and function identical to those of the micro lens array 34 in the ninth embodiment, and the function of the optical modulator device 102 remains identical to that of the second embodiment, and their description is omitted.

The positional relationship between these components is as follows. The center of curvature of the mirror element 152 deformed in the optical modulator device 102, the optical axis of the micro lens element 351 in the second micro lens array 35, the position of the pinhole 361 in the pinhole array 36, and the optical axis of the micro lens element 371 are adjusted in position to be mutually collinear. The pinhole 361 in the pinhole array 36 is adjusted in position to agree with the focal point of the micro lens element 371 in the first micro lens array 37. The micro lens element 351 in the second micro lens array 35 is adjusted in position such that the pinhole 361 is conjugate with the center of curvature of a sphere in which the shape of deformation of the mirror element 152, in its deformed state, in the optical modulator device 102 is approximated.

The operation of the optical modulator unit 106 is now discussed. The incident illuminating light rays 18 as parallel light rays are directed to the first micro lens array 37, and then converged at the pinholes 361 that are placed at the focal points of the respective micro lens elements 371 constituting the array. The illuminating light rays 18 become divergent light rays through the pin holes 361, and then directed to the micro lens elements 351 constituting the second micro lens array 35. The light rays incident on the micro lens elements 351 are converged there, and then directed to the mirror elements 15b constituting the optical modulator device 102.

The illuminating light rays 18 incident on the deformed mirror elements 152 are reflected by the reflective surfaces as reflective light rays 192. The reflected light rays 192 take almost the same optical path the incident light rays took, and then pass the pinholes 53, are converted into parallel light rays through the micro lens elements 371 constituting the first micro lens array 37, and are then projected outwardly through the optical modulator unit 106.

The illuminating light rays 18 incident on the undeformed mirror elements 151 are reflected by the reflective surfaces as reflected light rays 191. The reflected light rays 191 are first converged at the image points 193 of the respective micro lens elements 351 constituting the micro lens array 35, and then projected to the micro lens elements 351 as divergent light rays. The points that are conjugate with the image points 193 of the micro lens elements 351 are on the side of the first micro lens array 37 beyond the pinhole array 36. Therefore, the reflected light rays 191 are spread at the positions of the pinholes 361, and the slight amount of light admitted through the opening of each pinhole 361 can return to the first micro lens array 37.

According to the eleventh embodiment described above, by arranging the micro lens arrays, the illuminating light rays are directed to deformable portions only, avoiding portions unable to be deformed (non-deformable portions), surrounding each of the mirror elements. Thus, an optical modulator unit with a high utilization of light results.

The optical modulator unit 106, as it is, may replace the optical modulator unit 105 in the display unit described in connection with the tenth embodiment. Like the optical modulator unit 105, the optical modulator unit 106 offers a high utilization of light, and thus constitutes a display unit capable of displaying a bright image.

EXAMPLE

As for the dimensions of the optical modulator unit 106 of the eleventh embodiment, the external dimensions of each of the mirror elements 15b constituting the optical modulator device 102 are 50 μm×50 μm, the pitch of the mirror elements 15b is 100 μm, the curvature of radius of a sphere into which the shape of deformation of the mirror element 15b in its deformed state is approximated is approximately 1 mm, the spacing between the first micro lens array 37 and the pinholes 361 is approximately 1 mm, the diameter of the pinhole is approximately 10 μm, the spacing between the pinholes 361 and the second micro lens array 35 is approximately 1 mm, the spacing between the second micro lens array 35 and the reflective surface of the mirror element 15b is approximately 1 mm, the dimensions of each of the micro lens elements 371, 351 respectively constituting the first micro lens array 37 and the second micro lens array 35 are 100 μm×100 μm.

Twelfth Embodiment

A twelfth embodiment of the present invention relates to an optical modulator unit that equally offers a high utilization of light like the ninth and eleventh embodiments.

Figure 21:
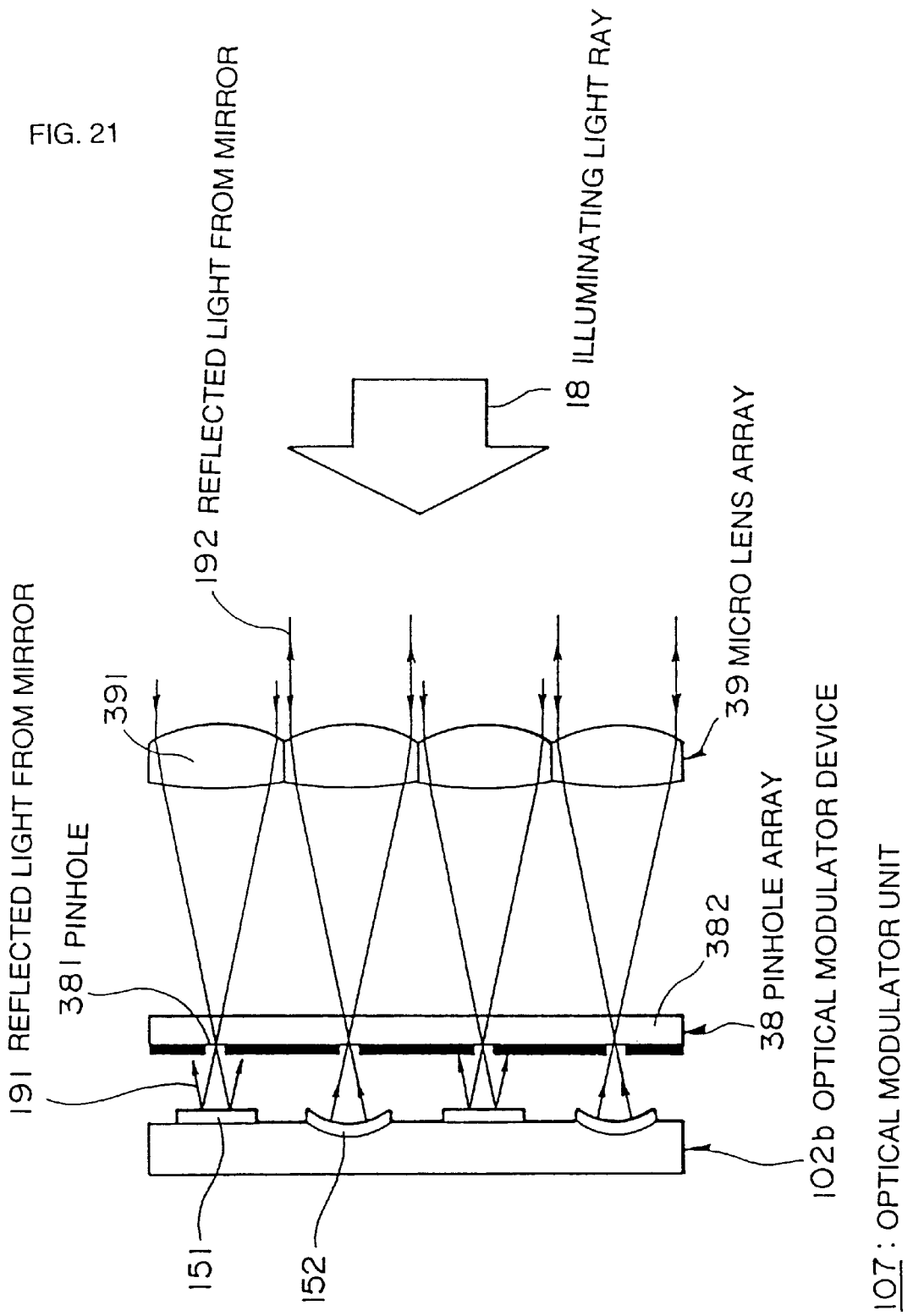
FIG. 21; Cross-sectional view showing the construction of an optical modulator unit according to a twelfth embodiment of the present invention.

The optical modulator unit 107 of the twelfth embodiment shown in FIG. 21 comprises an optical modulator device 102b, a pinhole array 38 and a micro lens array 39.

As the optical modulator device 102b, the optical modulator device described in connection with the second embodiment is used. As shown in FIG. 21, however, the mirror elements 15b are deformed in a concave open to incident illuminating light rays. This embodiment may work with other embodiments as long as their mirror elements are deformed in a concave. Furthermore, this embodiment may work with an optical modulator device equipped with the mirror element such as the one that is disclosed in U.S. Pat. No. 4,571,603.

The structure and function of the pinhole array 38 and the micro lens array 39 remain identical to those in the preceding eleventh embodiment, and thus their description is omitted herein. The pinhole array 38 is positioned such that its pinholes 381 agree with the respective focal points of the micro lens elements 391 of the micro lens array 39. The spacing between the optical modulator device 102b and the pinhole 38 is adjusted such that the center of curvature of a sphere into which the shape of deformation of each mirror element 152 in its deformed state is approximated agrees with the respective pinhole 381.

Next, the optical modulation operation of the optical modulator unit 107 of this embodiment is discussed. The illuminating light rays 18 are parallel and are directed to the surface of the micro lens array 39 at right angles thereto. The incident illuminating light rays 18 are converged by the micro lens elements 391 constituting the micro lens array 39, focused at the pinholes 381 that are at the focal points of the micro lens elements 391, then become diverged light rays, and directed to the mirror elements 15b constituting the optical modulator device 102b.

The illuminating light rays 18 incident on the deformed mirror elements 152 are reflected by their reflective surfaces as reflected light rays 192. Since the reflected light rays 192 take almost the same optical path the incident light rays took, they are again converged at the pinholes 381, pass there, become divergent light rays and then introduced to the micro lens array 39. Through the micro lens elements 391 constituting the micro lens array 39, the reflected light rays 192 are converted into parallel light rays, and then projected outwardly through the optical modulator unit 107.

On the other hand, the illuminating light rays 18 incident on the undeformed mirror elements 151 are reflected by their reflective surfaces as divergent reflected light rays 191. For this reason, only a slight amount of light of the reflected light rays 191 that is admitted through the pinholes 381 is allowed to return to the micro lens array 39.

According to the twelfth embodiment, as described above, by arranging the micro lens array, the illuminating light rays are directed to actually deformable portions only, avoiding portions unable to be deformed (non-deformable portions), surrounding each of the mirror elements. Thus, an optical modulator unit with a high utilization of light results.

EXAMPLE

As for the dimensions of the optical modulator unit 107 of the twelfth embodiment, the external Dimensions of each of the mirror elements 15b constituting the optical modulator device 102b are 50 μm×50 μm, the pitch of the mirror elements 15b is 100 μm, the curvature of radius of a sphere into which the shape of deformation of the mirror element 15b in its deformed state is approximated is approximately 1 mm, the dimensions of each of the micro lens elements 391 constituting the micro lens array 39 are 100 μm×100 μm, the spacing between the micro lens array 39 and the pinholes 381 is approximately 2 mm, the diameter of the pin hole 381 is approximately 15 μm, and the spacing between the pinholes 381 and the reflective surface of each mirror element 15b is approximately 1 mm.

Thirteenth Embodiment

A thirteenth embodiment of the present invention relates to a display unit in which the optical modulator unit in the twelfth embodiment is incorporated.

Figure 22:
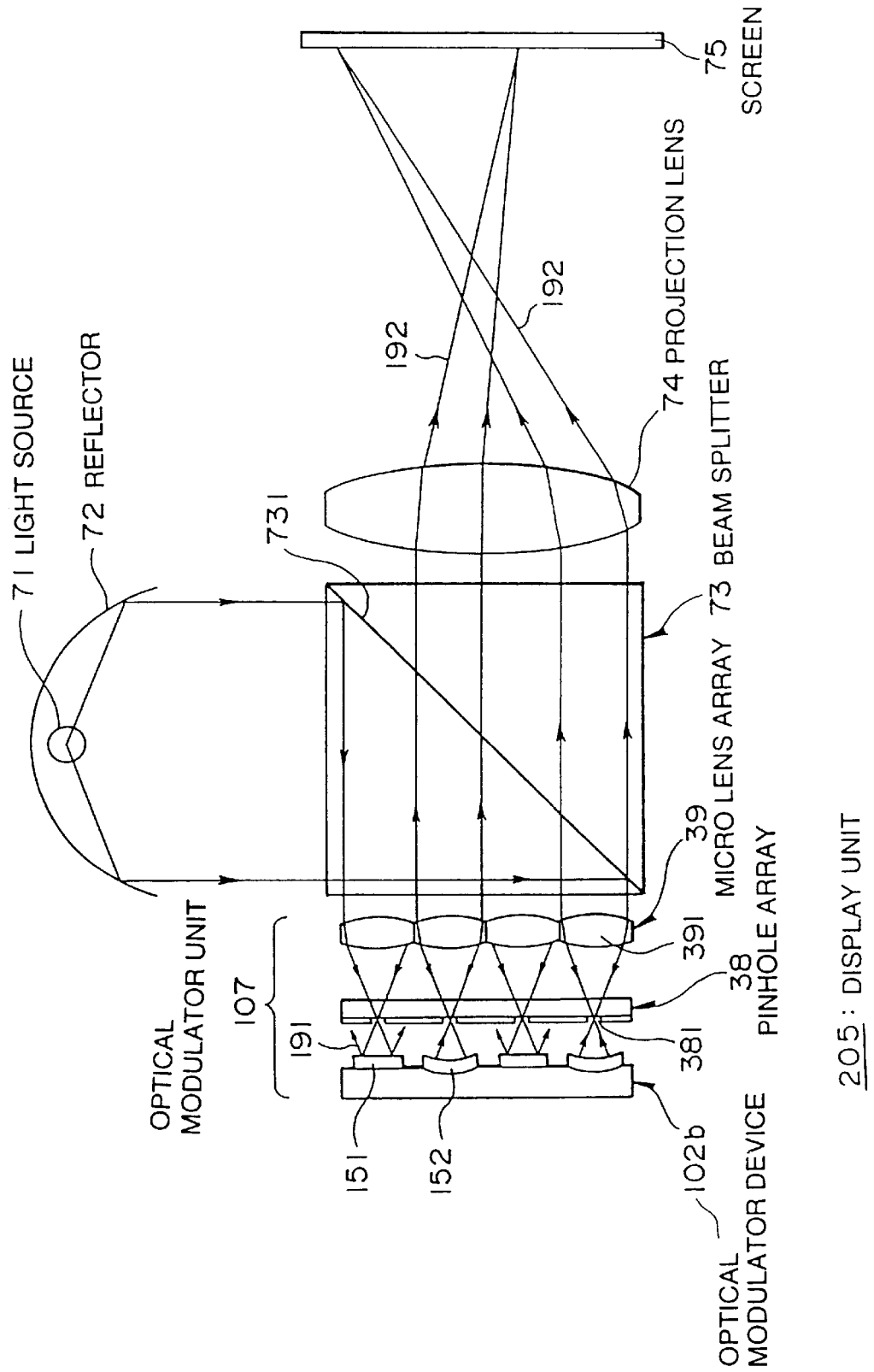
FIG. 22; Cross-sectional view showing the construction of a display apparatus according to a thirteenth embodiment of the present invention.

FIG. 22 is a cross-sectional view showing the construction of the display unit 205 of this embodiment.

The display unit 205 of this embodiment comprises the display unit 204 of the tenth embodiment but its optical modulator unit 105 replaced with the optical modulator unit 107 of the twelfth embodiment. The construction, function and advantage of each component are identical to those of the tenth embodiment, and their description is omitted here.

The optical modulator unit is not limited to the optical modulator unit 107 of the twelfth embodiment, and any optical modulator unit may be incorporated as long as its mirror elements are deformable in a concave open to incident illuminating light rays.

Fourteenth Embodiment

A fourteenth embodiment of the present invention relates to an component alternative to the light shading dot array and the micro lens array in the optical modulator unit described in connection with the ninth embodiment.

Figure 23:
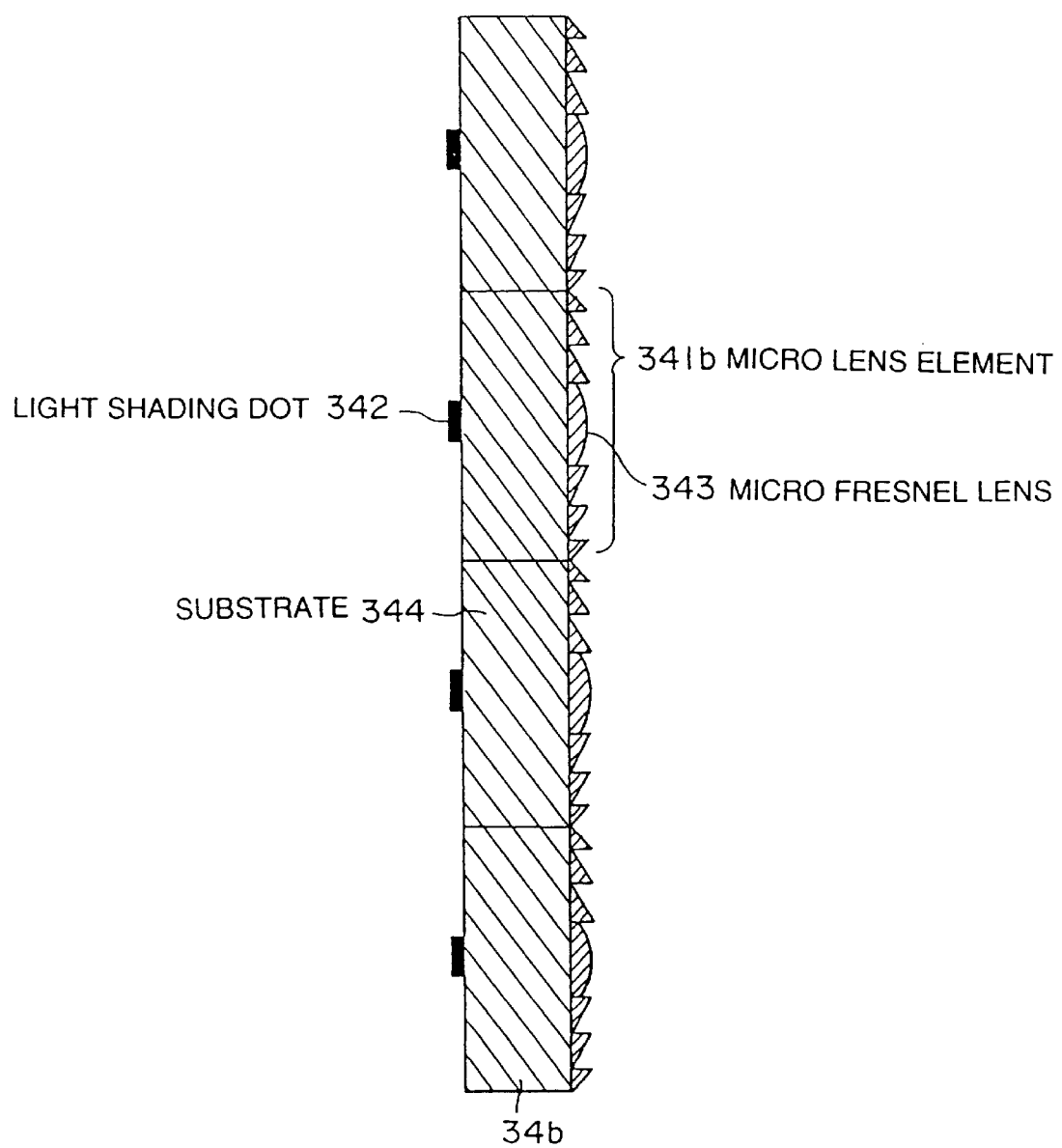
FIG. 23; Cross-sectional view showing the construction of a micro lens array according to a fourteenth embodiment of the present invention.

FIG. 23 is a cross-sectional view a the micro lens array 34b of this embodiment. Although FIG. 23 shows boundary lines between micro lens elements, in practice the micro lens array is integrally formed in a unitary body without such boundary. To help understand the structure of the micro lens array, only four micro lens elements are shown.

The micro lens array 34b is provided with micro lens elements 341b respectively corresponding to the mirror elements 15 of an optical modulator device. The micro lens elements 341b comprises a substrate 344 as its base, a micro Fresnel lens 343 on one side of the substrate 344 and light shading dots 342 on the other side of the substrate 344.

The substrate 344 is made of clear, light transmissive glass or resin. The micro Fresnel lens 43 is manufactured using a diversity of manufacturing processes. For example, in a transfer process, a resin is applied to one side of the substrate 344, and a die of a Fresnel lens configuration is pressed against the formed resin layer to transfer the configuration of the Fresnel lens; in a press molding process, a substrate having a micro Fresnel lens configuration on its top surface is integrally formed with glass base; and in an injection molding process, a substrate having a micro Fresnel lens configuration on its top surface is integrally formed with a transparent resin by injection molding the transparent resin. The light shading dots 342 are formed on the other side of the substrate 344 in the same manner as in the ninth embodiment. The thickness of the substrate 344 is set to be equal to the spacing between the micro lens array 34 and the light shading dot array 34 in the ninth embodiment.

In this embodiment, the micro Fresnel lens is used as a lens surface, but alternatively, the lens surface may be constituted by a single refractive surface spherical or aspherical. The manufacturing process that is applied to produce the micro Fresnel lens also works in this case.

The micro lens array 34b replaces both the light shading dot array 33 and the micro lens array 34 in the ninth embodiment, and performs the functions of both components.

According to the fourteenth embodiment, since the micro lens array and the light shading dot array are integrated into a single component, manufacturing the component is easy, the adjustment between the micro lens array and the light shading dot array becomes needless in a display unit, and the accuracy of adjustments in the display unit is increased. By replacing the micro Fresnel lens configuration with an aspheric lens configuration, the image quality of the micro lens array is increased.

Fifteenth Embodiment

A fifteenth embodiment of the present invention relates to a component alternative to the pinhole array and the micro lens array in the eleventh and twelfth embodiments.

Figure 24:
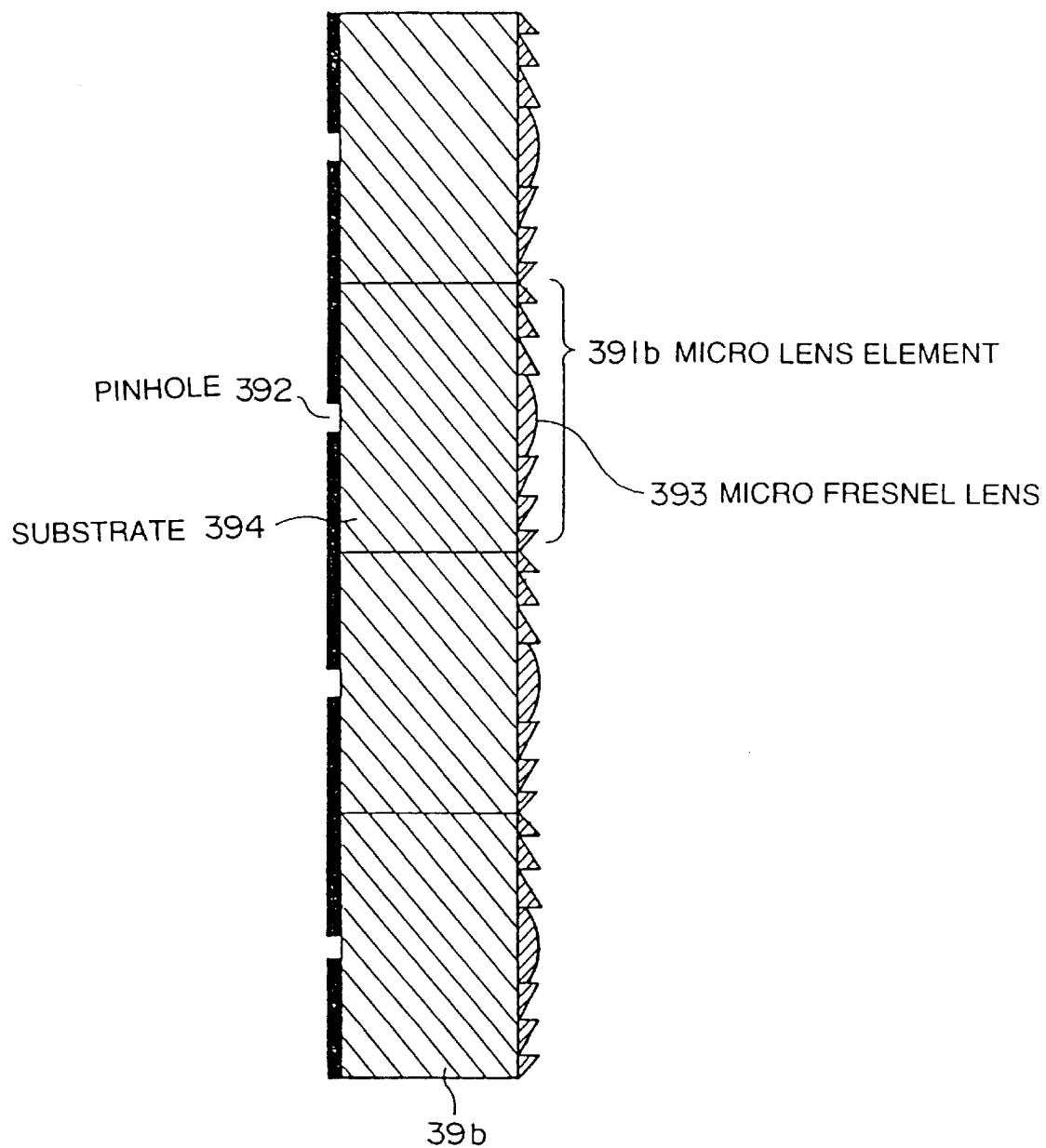
FIG. 24; Cross-sectional view showing the construction of a micro lens array according to a fifteenth embodiment of the present invention.

FIG. 24 is a cross-sectional view of a micro lens array 39b of this embodiment. Although FIG. 23 shows boundary lines between micro lens elements, in practice the micro lens array is integrally formed in a unitary body without such boundary. To help understand the structure of the micro lens array, only four micro lens elements are shown.

The micro lens array 39b is provided with micro lens elements 391b respectively corresponding to the mirror elements 15 of an optical modulator device. The micro lens elements 391b comprises a substrate 394 as its base, a micro Fresnel lens 393 on one side of the substrate 394 and pinholes 392 on the other side of the substrate 394.

The composition of the substrate 394 and the manufacturing process of the micro Fresnel lens 393 remain identical to those in the fourteenth embodiment, and the pinhole 392 is identical to that in the eleventh embodiment, and its description is omitted. The thickness of the substrate 394 is set to be equal to the spacing between the micro lens array and the pinholes in their mounted positions.

The micro lens array 39b works as a substitute for the micro lens array 37 and the pinhole array 36 in the eleventh embodiment (FIG. 20), or as a substitute for the micro lens array 35 and the pinhole array 36. Furthermore, the micro lens array 39b works as a substitute for the micro lens array 39 and the pinhole array 38 in the twelfth embodiment.

According to the fifteenth embodiment, since the micro lens array and the pinhole array are integrated into a single component, manufacturing the component is easy, the adjustment between the micro lens array and the pinhole array becomes needless in a display unit, and the accuracy of adjustments in the display unit is increased. By replacing the micro Fresnel lens configuration with an aspheric lens configuration, the image quality of the micro lens array is increased.

Sixteenth Embodiment

A sixteenth embodiment of the present invention relates to a color display unit in which the optical modulator unit of the ninth embodiment is incorporated.

Figure 25:
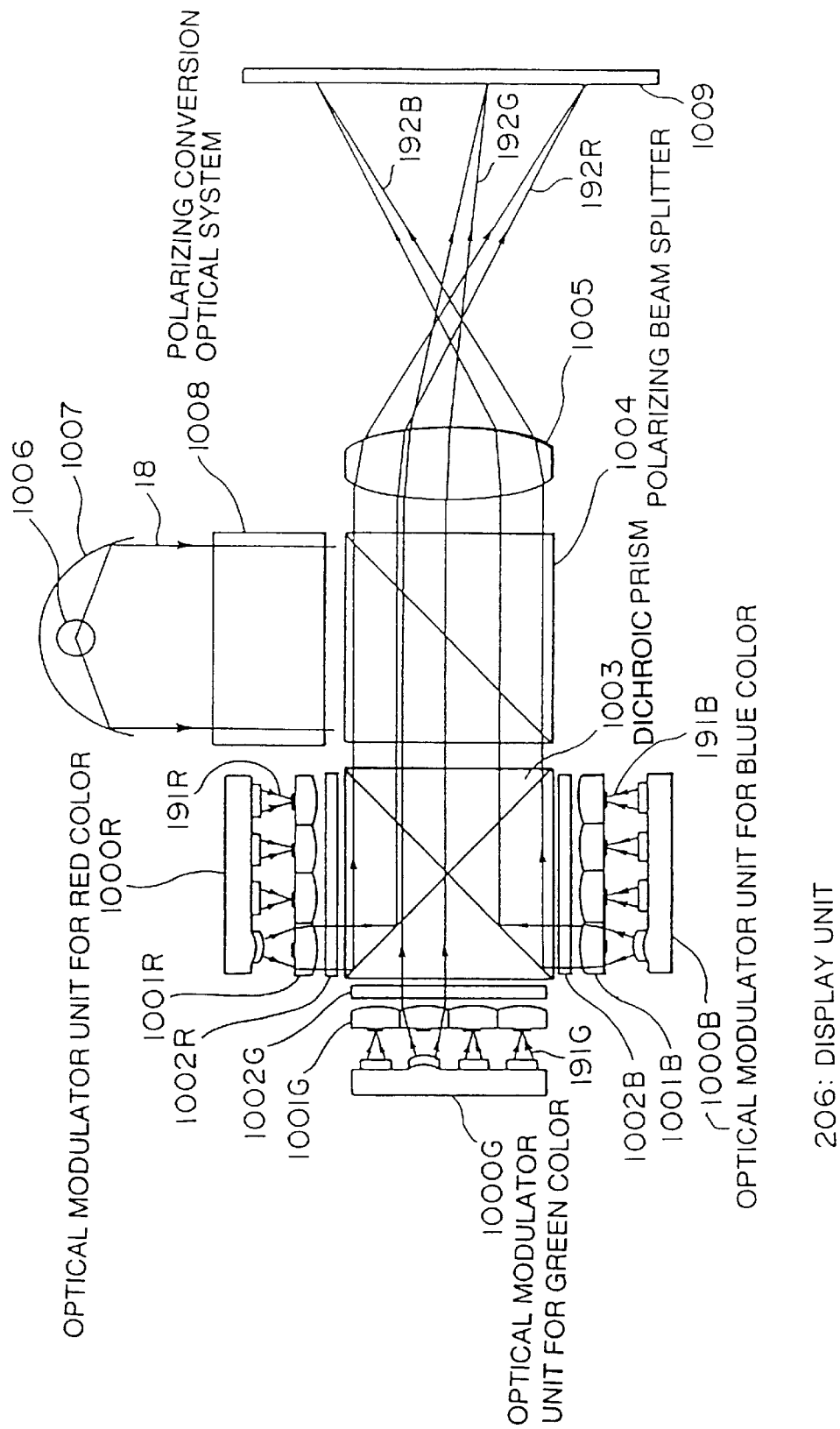
FIG. 25; Cross-sectional view showing the construction of a display apparatus according to a sixteenth embodiment of the present invention.

FIG. 25 is a cross-sectional view showing the construction of a display unit 206 of this embodiment. FIG. 25 shows the cross section of optical components taken along the optical axis of an illuminating light ray. As shown, the display unit 206 comprises a light source 1006, a reflector 1007, a polarizing conversion optical system 1008, a polarizing beam splitter 1004, a dichroic prism 1003 having an optical modulator unit and a ½-wave plate, and a projection lens 1005. The display unit 206 also comprises optical modulator units for red (R), blue (B) and green (G) (1000R, 1000B, 1000G, 1001R, 1001B, and 1001G) and ¼-wave plates 1002R, 1002B, and 1002G (hereinafter symbols R, G and B are omitted when three color components are simultaneously processed).

The optical modulator unit comprises the optical modulator unit 105 of the ninth embodiment but with its light shading dot array 33 and micro lens array 34 replaced with the micro lens array 34b of the fourteenth embodiment. Alternatively, one of the optical modulator units described in connection with the preceding embodiments is also acceptable.

The ¼-wave plate 1002 converts circularly polarized light rays into linearly polarized light rays, or converts linearly polarized light rays into circularly polarized light rays. The polarizing conversion optical system 1008 divides incident illuminating light rays into components of light rays mutually perpendicular in their polarization directions, rotates the polarization direction of one component by 90°, combine them with the other component, and finally outputs linearly polarized light rays having one polarization direction. In this embodiment, the optical axis of the polarizing conversion optical system 1008 is set up such that it output s-polarized light rays to the polarizing beam splitter 1004.

The polarizing beam splitter 1004 reflects s-polarized light rays but transmits p-polarized light rays.

The dichroic prism 1003 reflect, out of the illuminating light rays 18, a red color component of light rays and a blue color component of light rays at right angles and in diametrically opposite directions to each other, and transmits a green color component of light rays.

The optical modulation operation of the display unit 206 of this embodiment is now discussed. The illuminating light rays 18 emitted from the light source 1006 such as a metal halide lamp are converted into substantially parallel light rays by the parabolic reflector 1007, and directed to the polarizing conversion optical system 1008. The illuminating light rays 18 are converted into s-polarized light rays that are linearly polarized light rays, and then directed to the polarizing beam splitter 1004. The polarizing beam splitter 1004 reflects the s-polarized light rays, thus bending the illuminating light rays 18 by 90°, and then directs them to the dichroic prism 1003. The dichroic prism 1003 bends the red and blue color components by 90° in diagonally opposite directions but transmits the green color component, and thus projects s-polarized light rays in each color component outwardly. Since one ¼-wave plate 1002 is arranged between the dichroic prism 1003 and each optical modulator unit (1000, 1001) for the respective color component, the s-polarized light rays in each color component are converted into circularly polarized light rays and then directed to the optical modulator units (1000, 1001).

As already described in connection with the preceding embodiment, the optical modulator units block the reflected light rays 191 from the undeformed mirror elements and output only the reflected light rays 192 from the deformed mirror elements. When the circularly polarized light rays are reflected from the mirror elements of the optical modulator devices 1000, the direction of rotation of the circularly polarized light rays is inverted. As the circularly polarized light rays with an inverted direction of rotation, the optical modulator unit for the red color component outputs reflected light rays 192R, the optical modulator unit for the blue color component outputs reflected light rays 192B, and the optical modulator unit for the green color component outputs reflected light rays 192G, as a result, and then the reflected light rays are directed to the respective ¼-wave plates.

The reflected light rays 192R, 192B, and 192G for three color components are converted again into linearly polarized light rays through the respective ¼-wave plates 1002. Since the direction of rotation of the light rays incident on each ¼-wave plate 1002 is different from the direction of rotation of the incident illuminating light rays 18 from the dichroic prism 1003, the converted, linearly polarized light rays become p-polarized light rays.

The p-polarized reflected light rays 192R, 192B and 192G for the three primary colors are introduced to the dichroic prism 1003. The dichroic prism 1003 bends the reflected red light rays 192R and the reflected blue light rays 192B by 90° but transmits the reflected green light rays 192G, and thus forms combined light rays, which are projected as a color image on a screen 1009 via the projection lens 1005.

Since in this embodiment, the optical modulator units modulate the red, blue and green light rays within their respective narrow bands, the micro lens arrays constituting each spatial modulator unit may be designed to meet the optical performance requirements such as focal lengths and aberrations in terms of required wavelengths only. Since the light rays within a limited range only are considered, the generation of chromatic aberrations is reduced, and focal power of the lens is thus increased. When the micro lens element in the optical modulator unit is constructed of a lens that utilizes diffraction, it presents a large chromatic aberration compared with refractive type lenses, and thus the higher focal power is provided as the band of wavelengths of interest gets narrower.

With the focal power of a lens increasing, a light shading dot or a pinhole in the vicinity of the focal point of the lens may be reduced in size. The image contrast in light modulation process is thus enhanced by reducing the amount light blocked by the light shading dot or by increasing the amount of unmodulated light that is blocked by the periphery of the pinhole. With such an optical modulator unit, a display unit with a high projection image contrast is provided.

Although the illuminating light rays 18 from the light source 1006 are transmitted through the polarizing conversion optical system 1008 and the polarizing beam splitter 1004, and then directed to the dichroic prism 1003 in the display unit 206 of this embodiment, another arrangement may be contemplated. For example, as described in connection with the tenth embodiment, an illumination optical system may be contemplated which employs a half-mirror instead of the polarizing beam splitter with the polarizing conversion optical system dispensed with.

According to the sixteenth embodiment, since the color image presentation is given using the optical modulator unit according to the present invention, a display unit capable of presenting a bright color image is provided.

Modification

Although the polarizing beam splitter that reflects the s-polarized light rays but transmits the p-polarized light rays is used in the sixteenth embodiment, the light source 1006, reflector 1007 and polarizing conversion optical system 1008 may be placed at the positions of the projection lens 1005 and screen 1009, and the projection lens 1005 and screen 1009 may be placed at the positions of the light source 1006, reflector 1007 and polarizing conversion optical system 1008 in FIG. 25. In this case, the optical axis of the polarizing conversion optical system 1008 is set up such that the p-polarized light rays are projected to the polarizing beam splitter 1004.

According to the above arrangement, the p-polarized light rays are directed to each optical modulator unit via the polarizing beam splitter 1004, the reflected light rays from each optical modulator unit become s-polarized light rays, and the s-polarized light rays are then directed back to the polarizing beam splitter, then bent by 90° toward the projection lens 10 and then focused on the screen 1009.

Other Embodiments

The present invention is not limited to the above embodiments, and is embodied in other diversity of forms. For example, in each of the above display units, components constituting each optical system may be changed to meet the characteristics of a spatial modulator device or spatial modulator unit.

Although an image modulated by the optical modulator unit is enlarged and projected onto the screen in each of the above display units, the display unit may be of such a type as a viewfinder in which an observer sees a virtual image enlarged by the optical modulator unit through a lens.

What is claimed is:

1. An optical modulator device comprising a substrate;
an optical modulator structure formed over the substrate,
the optical modulator structure comprising mirror elements in which a piezoelectric thin film layer having a piezoelectric property is interposed between thin film electrode layers each having an electrically conductive property with at least one of the thin film electrode layers having a light reflective property; and
a substrate cutout area formed in the substrate adjacent each of the mirror elements, the substrate cutout area functioning as an optical path in the substrate,
the optical modulator structure being driven on a mirror element by mirror element basis, with each mirror element working independently to modulate a light ray.

2. The optical modulator device according to claim 1, the mirror elements being arranged in a matrix on the substrate, the matrix including a one-dimensional array configuration having a plurality of rows and a plurality of columns.

3. The optical modulator device according to claim 2, a first thin film electrode layer of the thin film electrode layers constituting the optical modulator structure being electrically commonly connected to a plurality of mirror elements arranged in each of the columns constituting the matrix, on a column by column basis, and a second thin film electrode layer of the thin film electrode layers constituting the optical modulator structure being electrically commonly connected to the mirror elements arranged in each of the rows constituting the matrix, on a row by row basis.

4. The optical modulator device according to claim 1, a first thin film electrode layer of the thin film electrode layers constituting the optical modulator structure being electrically commonly connected to all of the mirror elements and functioning as a common electrode for all of the mirror elements, and a second thin film electrode layer of the thin film electrode layers constituting the optical modulator structure being arranged in an electrically isolated form for each of the mirror elements on a mirror element by mirror element basis.

5. The optical modulator device according to claim 1, the substrate cutout areas being independently formed for the respective mirror elements on a one substrate cutout area per mirror element basis.

6. The optical modulator device according to claim 5, a shape of the opening of the substrate cutout area being formed of a curve.

7. The optical modulator device according to claim 1, the substrate cutout area being commonly shared by the plurality of mirror elements.

8. The optical modulator device according to claim 7, the substrate cutout area being commonly shared by the plurality of mirror elements arranged in a column.

9. The optical modulator device according to claim 1, the second thin film electrode layer constituting the mirror elements being smaller in size than an opening of the substrate cutout area.

10. The optical modulator device according to claim 1, the mirror elements being deformed in a convex projecting in a direction from which an incident light comes in.

11. The optical modulator device according to claim 1, the mirror elements being deformed in a convex projecting in a direction opposite a direction from which an incident light ray comes in.

12. The optical modulator device according to claim 1, further comprising a member for shading a light ray placed at a position where light rays modulated by the mirror elements may be focused; and
a transparent plate arranged in parallel with a plane of the optical modulator structure.

13. The optical modulator device according to claim 12, the member for shading a light ray comprising a light shading member made of a material through which a light ray is not transmitted.

14. The optical modulator device according to claim 13, the light shading member being a metal plate of chromium.

15. The optical modulator device according to claim 13, the light shading member being formed on the transparent plate.

16. The optical modulator device according to claim 15, the light shading member being an opaque material that is deposited or printed on the transparent plate.

17. The optical modulator device according to claim 16, the opaque material being chromium.

18. The optical modulator device according to claim 16, the opaque material being a pigmented ink.

19. The optical modulator device according to claim 12, the light shading member being of a rectangular shape.

20. The optical modulator device according to claim 12, the light shading member being of a circular shape.

21. The optical modulator device according to claim 1 further comprising, to the side of the mirror elements on which an illuminating light ray is incident, a lens array which comprises lens elements corresponding to the respective mirror elements.

22. The optical modulator device according to claim 21, a conjugate point of the lens element to the mirror element side being approximately aligned with a center of curvature of the mirror element.

23. The optical modulator device according to claim 21 further comprising, between the optical modulator structure and the lens array, a light shading array comprising an array of light shading elements that are placed in vicinities of focal points of the respective lens elements.

24. The optical modulator device according to claim 23, the lens array and the light shading array being respectively mounted on opposing sides of a transparent body.

25. The optical modulator device according to claim 23, the lens array comprising a first lens array facing an incident illuminating light ray and a second lens array facing the optical modulator structure, and the optical modulator device further comprising a pinhole array, between the first lens array and the second lens array, having an array of pinholes which are arranged in vicinities of the focal points of the respective lens elements constituting the first lens array and also in vicinities of the conjugate points of the respective lens elements constituting the second lens array, and the optical axis of each of the respective mirror elements, the optical axis of each of the respective lens elements of the first lens array, the optical axis of each of the respective pinholes, and the optical axis of each of the respective lens elements in the second lens array being mutually collinear.

26. The optical modulator device according to claim 25, the first lens array and the pinhole array being respectively mounted on opposing sides of a transparent body.

27. The optical modulator device according to claim 21 further comprising, between the optical modulator structure and the lens array, a pinhole array comprising an array of pinholes that are placed in vicinities of focal points of the respective lens elements.

28. The optical modulator device according to claim 27, wherein the lens array and the pinhole array being respectively mounted on opposing sides of a transparent body.

29. The optical modulator device according to claim 21, each of the lens elements constituting the lens array being constructed of a Fresnel lens structure.

30. The optical modulator device according to claim 1, further comprising transistor structures electrically driving the mirror elements being correspondingly arranged on a one transistor structure per one mirror element basis.

31. The optical modulator device according to claim 30, the transistor structure being of a thin film transistor that comprises a thin film electrode layer and an insulating layer.

32. The optical modulator device according to claim 30, the transistor structure being formed on a second substrate that is different from the substrate that bears the mirror elements, and the substrate bears the mirror elements being bonded to the second substrate in such a manner that a drain electrode of the transistor structure is electrically connected to a second thin electrode layer constituting the mirror element to be driven by the transistor structure.

33. The optical modulator device according to claim 32, the second substrate being a glass substrate.

34. The optical modulator device according to claim 32, the second substrate being a silicon substrate.

35. The optical modulator device according to claim 32, further comprising a space provided adjacent the mirror elements allowing the mirror elements to be deformed.

36. The optical modulator device according to claim 32, further comprising a driver circuit for driving the transistor structure monolithically formed on the substrate that bears the transistor structure.

37. A display unit having the optical modulator device according to claim 1 comprising:

an illuminating optical system directing substantially parallel illuminating light rays to the optical modulator device at right angles thereto, a light shading optical system shading light rays reflected from undeformed ones of the mirror elements in the optical modulator device and passing therethrough light rays reflected from deformed ones of the minor elements, and a display optical system for focusing light rays that pass through the light shading optical system, to form an image.

38. The display unit according to claim 37, the illuminating optical system further comprising a light source, a display optical system converting radiated light rays from the light source into substantially parallel light rays, and a half-mirror deflecting the substantially parallel light rays by an approximately right angle to illuminate the optical modulator device, and light rays reflected from the optical modulator device being transmitted through the half-mirror and the light shading optical system, and then displayed as an image by the display optical system.

39. The display unit according to claim 37, the illuminating optical system comprising a polarizing conversion optical system aligning directions of oscillation of light rays radiated from the light source, a polarizing beam splitter arranged between the polarizing conversion optical system and the optical modulator device, and a ¼-wave plate arranged between the polarizing beam splitter and the optical modulator device.

40. The display unit according to claim 37, the illuminating light rays being directed to the mirror elements constituting the optical modulator device from a side of the substrate that bears the mirror elements.

41. The display unit according to claim 37, the amount of deformation of each mirror element being continuously controlled by varying continuously a voltage applied to each mirror element, and a gradation of the displayed image being continuously controlled by varying a quantity of light that passes through the light shading optical system.

42. A display unit having the optical modulator device according to claim 1 comprising:

a color separation optical system separating the illuminating light rays into a plurality of primary color light rays, the optical modulator devices receiving and reflecting the primary color light rays separated by the color separation optical system, a color synthesizing optical system synthesizing the light rays from the optical modulator devices, and a projection lens forming on an image plane an image synthesized by the color synthesizing optical system.

43. The display unit according to claim 42 comprising:

a polarizing conversion optical system arranged between the light source and the color separation optical system, aligning directions of oscillation of light rays radiated from the light source, a polarizing beam splitter arranged between the polarizing conversion optical system and the color separation optical system reflecting the light rays transmitted through the polarizing conversion optical system to direct the light rays to the color separation optical system, and ¼-wave plates, each arranged between each of the optical modulator devices for the respective primary colors and the color separation optical system, light rays, reflected from the respective optical modulator devices and synthesized through the color synthesizing optical system, being transmitted through the polarizing beam splitter and projected on the image plane through the projection lens.

44. The display unit according to claim 42 comprising:

a polarizing conversion optical system arranged between the light source and the color separation optical system, aligning directions of oscillation of light rays radiated from the light source, a polarizing beam splitter arranged between the polarizing conversion optical system and the color separation optical system transmitting the light rays transmitted through the polarizing conversion optical system to direct the light rays to the color separation optical system, and ¼-wave plates, each arranged between each of the optical modulator devices for the respective primary colors and the color separation optical system, light rays, reflected from the respective optical modulator devices and synthesized through the color synthesizing optical system, being reflected back from the polarizing beam splitter and then projected on the image plane through the projection lens.

45. The display unit according to claim 43, the color separation optical system and the color synthesizing optical system comprising a dichroic prism as a single optical component.

46. The display unit according to claim 43, the optical modulator devices for the primary colors being different from device to device depending on primary color in terms of shapes and optical characteristics of lens elements constituting a lens array of the optical modulator device, and the lens elements of the lens array in the optical modulator device for one primary color being designed in consideration of the range of wavelengths of the one primary color.

47. The display unit according to claim 46, the primary colors being red, green and blue.

48. An electronic apparatus, which incorporates the display unit according to claim 42.

49. The electronic apparatus according to claim 48, the electronic apparatus being selected from the group consisting of a computer, a television set, a watch, an electronic pocket notebook, and an electronic telephone.

* * * * *